United States Patent
Leviseur

(10) Patent No.: US 11,265,292 B1
(45) Date of Patent: Mar. 1, 2022

(54) GRAPH BASED MANAGEMENT OF VIRTUALIZED INFRASTRUCTURES

(71) Applicant: Amazon Technologies, Inc., Seattle, WA (US)

(72) Inventor: Sean James Leviseur, New York, NY (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 359 days.

(21) Appl. No.: 16/259,846

(22) Filed: Jan. 28, 2019

(51) Int. Cl.
| | |
|---|---|
| *H04L 29/06* | (2006.01) |
| *H04L 41/0816* | (2022.01) |
| *H04L 41/0873* | (2022.01) |
| *H04L 43/045* | (2022.01) |
| *H04L 43/026* | (2022.01) |
| *H04L 41/14* | (2022.01) |

(Continued)

(52) U.S. Cl.
CPC ...... *H04L 63/0263* (2013.01); *G06F 9/45558* (2013.01); *H04L 41/0816* (2013.01); *H04L 41/0873* (2013.01); *H04L 41/0893* (2013.01); *H04L 41/145* (2013.01); *H04L 43/026* (2013.01); *H04L 43/045* (2013.01); *H04L 63/1425* (2013.01); *H04L 63/20* (2013.01); *G06F 2009/45562* (2013.01)

(58) Field of Classification Search
CPC ............... H04L 63/0263; H04L 43/062; H04L 63/1458; H04L 41/065; H04L 41/142; H04L 41/22; G06F 9/4558; G06F 3/0482; G06F 9/45558; G06F 9/5077
See application file for complete search history.

(56) References Cited

U.S. PATENT DOCUMENTS

| | | | | |
|---|---|---|---|---|
| 4,845,764 A | * | 7/1989 | Ueda | G06K 9/481 |
| | | | | 382/146 |
| 5,993,050 A | * | 11/1999 | Miura | G06F 30/23 |
| | | | | 703/2 |

(Continued)

OTHER PUBLICATIONS

Dictionary, "serve", 2021 (Year: 2021).*

(Continued)

*Primary Examiner* — Ondrej C Vostal
(74) *Attorney, Agent, or Firm* — Hogan Lovells US LLP

(57) ABSTRACT

Technology is described for mapping virtualized infrastructure resources and associated flows in a virtualized infrastructure of a service provider environment. An application dataflow involving a virtualized infrastructure resource may be described using a swim lane model. Controls within the virtualized infrastructure to enforce segmentation and security of the application dataflow may be deduced from how the application dataflow is secured into a corresponding swim lane. An infrastructure mapping service may use information that identifies virtualized infrastructure resources and describes application dataflows in the virtualized infrastructure to generate a map of the virtualized infrastructure in the form of a graph. The graph may provide a visual representation that is easy for an auditor or engineer to understand. In addition, the graph generated by the infrastructure mapping service may be stored in a graph database providing quicker access to a representation or abstraction of the virtualized infrastructure for configuration, management, and auditing.

20 Claims, 12 Drawing Sheets

(51) Int. Cl.
*G06F 9/455* (2018.01)
*H04L 41/0893* (2022.01)

(56) References Cited

U.S. PATENT DOCUMENTS

| | | | | |
|---|---|---|---|---|
| 7,415,512 | B1* | 8/2008 | Moon | G06F 8/60 709/220 |
| 8,286,176 | B1* | 10/2012 | Baumback | H04L 47/823 718/104 |
| 9,170,845 | B2* | 10/2015 | Kshirsagar | G06F 9/5022 |
| 9,559,928 | B1* | 1/2017 | Porter | H04L 41/5058 |
| 9,712,386 | B1* | 7/2017 | Chen | H04L 41/0893 |
| 10,200,252 | B1* | 2/2019 | Qin | H04L 41/22 |
| 10,230,601 | B1* | 3/2019 | Qin | H04L 43/08 |
| 10,320,644 | B1* | 6/2019 | Chen | H04L 41/083 |
| 10,469,317 | B1* | 11/2019 | Jiang | G06F 9/45504 |
| 10,985,997 | B2* | 4/2021 | Duggal | G06Q 30/0635 |
| 10,992,585 | B1* | 4/2021 | Gilman | H04L 41/0813 |
| 11,018,959 | B1* | 5/2021 | Neill | H04L 43/062 |
| 2002/0107844 | A1* | 8/2002 | Cha | G06F 16/3344 |
| 2004/0032857 | A1* | 2/2004 | Tannan | H04L 41/145 370/351 |
| 2011/0295999 | A1* | 12/2011 | Ferris | G06F 9/5072 709/224 |
| 2013/0167241 | A1* | 6/2013 | Siman | G06F 16/9024 726/25 |
| 2013/0191829 | A1* | 7/2013 | Shimokawa | H04L 43/18 718/1 |
| 2013/0212131 | A1* | 8/2013 | Reddy | G06F 16/9024 707/798 |
| 2014/0019966 | A1* | 1/2014 | Neuse | G06F 9/45533 718/1 |
| 2014/0059178 | A1* | 2/2014 | Dutta | H04L 41/0883 709/219 |
| 2014/0130160 | A1* | 5/2014 | Golovanov | H04L 63/1425 726/23 |
| 2014/0161131 | A1* | 6/2014 | Yang | H04L 12/4658 370/401 |
| 2014/0201642 | A1* | 7/2014 | Vicat-Blanc | H04L 41/22 715/736 |
| 2014/0280488 | A1* | 9/2014 | Voit | G06F 9/5083 709/203 |
| 2015/0095269 | A1* | 4/2015 | Matignon | G06N 5/02 706/11 |
| 2015/0128271 | A1* | 5/2015 | Shin | H04W 40/246 726/23 |
| 2016/0019228 | A1* | 1/2016 | Hong | G06F 16/9024 707/624 |
| 2016/0072831 | A1* | 3/2016 | Rieke | H04L 43/062 726/1 |
| 2016/0205002 | A1* | 7/2016 | Rieke | H04L 43/067 709/224 |
| 2016/0314010 | A1* | 10/2016 | Haque | G06F 9/45558 |
| 2016/0321096 | A1* | 11/2016 | Harper | G06F 9/45558 |
| 2016/0359680 | A1* | 12/2016 | Parandehgheibi | G06F 3/0482 |
| 2017/0041186 | A1* | 2/2017 | Nelson | H04L 41/0803 |
| 2017/0195171 | A1* | 7/2017 | Wohlert | H04L 41/5009 |
| 2017/0272379 | A1* | 9/2017 | McClean | H04L 41/22 |
| 2017/0279687 | A1* | 9/2017 | Muntes-Mulero | H04L 41/065 |
| 2017/0279735 | A1* | 9/2017 | Yousaf | G06F 9/5083 |
| 2017/0308621 | A1* | 10/2017 | Wu | G06F 16/9024 |
| 2017/0310691 | A1* | 10/2017 | Vasseur | H04L 63/1458 |
| 2018/0121222 | A1* | 5/2018 | Sharma | G06F 9/5077 |
| 2018/0183724 | A1* | 6/2018 | Callard | H04L 41/08 |
| 2018/0225139 | A1* | 8/2018 | Hahn | H04L 12/4625 |
| 2018/0287876 | A1* | 10/2018 | Strobel | H04L 41/12 |
| 2018/0324090 | A1* | 11/2018 | Duncan | H04L 12/4641 |
| 2019/0058643 | A1* | 2/2019 | Knowles | G06F 11/3409 |
| 2019/0116053 | A1* | 4/2019 | Allan | H04L 12/18 |
| 2019/0123983 | A1* | 4/2019 | Rao | H04L 41/0893 |
| 2019/0230127 | A1* | 7/2019 | Gandham | H04L 41/082 |
| 2019/0278928 | A1* | 9/2019 | Rungta | G06F 9/485 |
| 2019/0354411 | A1* | 11/2019 | Raikov | G06F 9/455 |
| 2020/0067783 | A1* | 2/2020 | Kamath | H04L 41/142 |
| 2020/0159917 | A1* | 5/2020 | Cervantez | G06N 5/025 |

OTHER PUBLICATIONS

Dictionary, "service", 2021 (Year: 2021).*
Merriam-Webster, "serve", 2021 (Year: 2021).*
Merriam-Webster, "service", 2021 (Year: 2021).*
Claffy et al., "A Parameterizable Methodology for Internet Traffic Flow Profiling", 1995 (Year: 1995).*
Herrera et al., "Resource Allocation in NFV: A Comprehensive Survey", 2016 (Year: 2016).*
Kumbhare et al., "Exploiting Application Dynamism and Cloud Elasticity for Continuous Dataflows", 2013 (Year: 2013).*
Kumbhare et al., "Reactive Resource Provisioning Heuristics for Dynamic Dataflows on Cloud Infrastructure", 2015 (Year: 2015).*
Panorama: Capturing System-wide Information Flow for Malware Detection and Analysis, 2007 (Year: 2007).*
Guzek et al., "A Holistic Model for Resource Representation in Virtualized Cloud Computing Data", 2013 (Year: 2013).*

* cited by examiner

GRAPH BASED MANAGEMENT OF VIRTUALIZED INFRASTRUCTURES

BACKGROUND

Many companies and organizations operate computer networks that interconnect numerous computing systems to support computing operations. The computing systems may be co-located (e.g., as part of a local network) or located in multiple distinct geographical locations (e.g., connected via one or more private or public wide area networks). For example, data centers housing significant numbers of interconnected computing systems have become commonplace. Such data centers may be private data centers that are operated by and on behalf of a single organization or public data centers that are operated by entities as businesses to provide computing resources to customers. Some public data center operators provide network access, power, and secure installation facilities for the hardware owned by various customers, while other public data center operators provide "full service" facilities that also include hardware resources made available for use by their customers to use virtualized computing services.

Virtualized computing services have provided benefits with respect to managing large-scale computing resources for many users with diverse needs, allowing various physical computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines.

The configuration and security of virtualized computing resources and associated data is important. Virtualized infrastructures often span multiple geographic boundaries and connect with other networks. Virtualized infrastructures may be complex to manage and ensuring that access to the virtualized infrastructures is authorized and that the virtualized infrastructures are securely maintained can be challenging, especially as the size and complexity of such environments increase.

DETAILED DESCRIPTION

Figure 1:
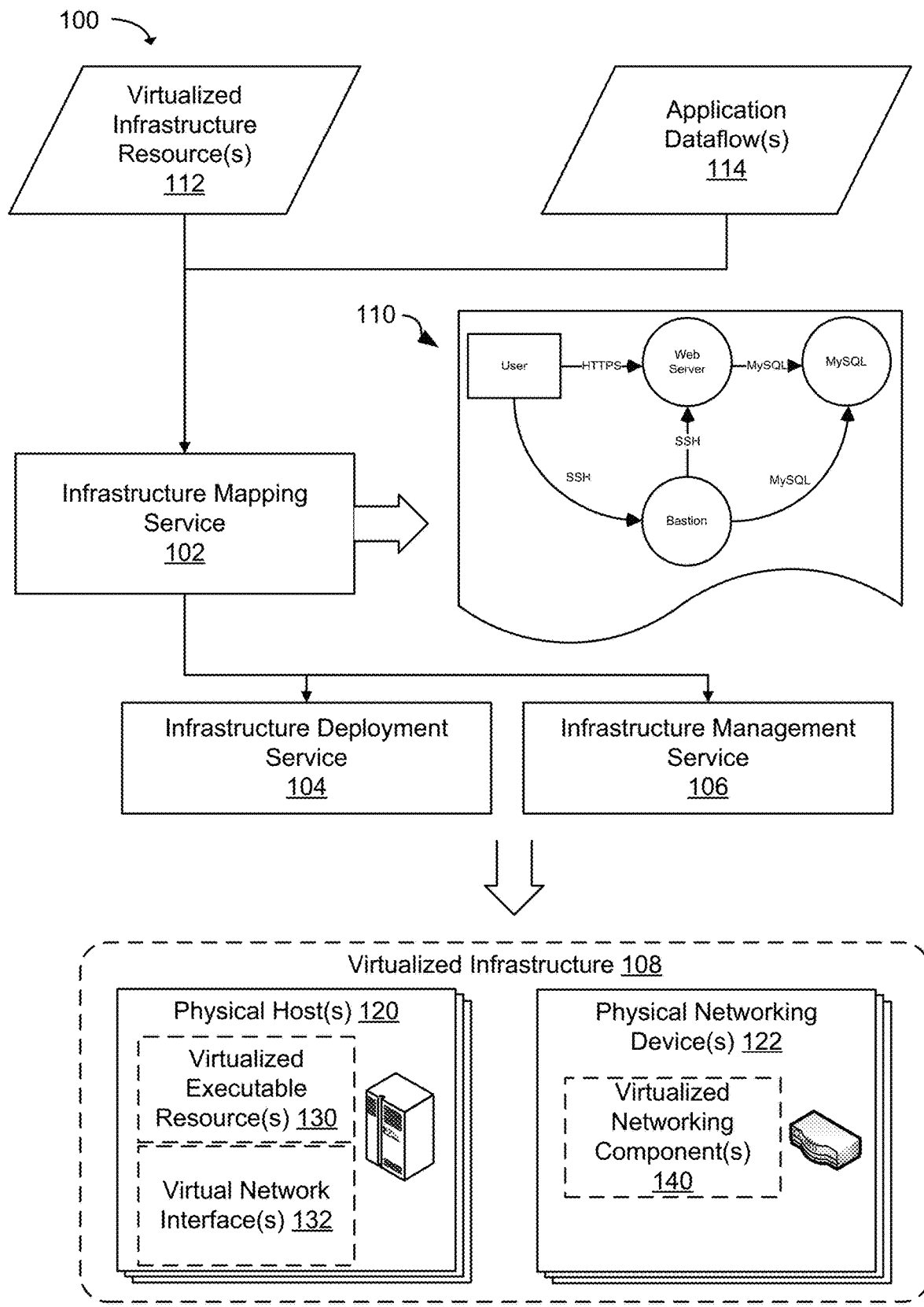
FIG. 1 illustrates a service provider environment and related operations that may manage virtualized infrastructures using infrastructure maps according to an example of the present technology.

A technology is described for mapping virtualized infrastructure resources and associated application dataflows in virtualized infrastructures of a service provider environment using an infrastructure mapping service. The infrastructure mapping service may ingest data, from a control plane of a service provider environment, that identifies one or more virtualized infrastructure resources such as virtual executable resources (e.g., computing instances, containers, code functions, etc.), virtualized data stores, virtualized services, and virtual networking components (e.g., virtual networking interfaces and virtualized or physical networking devices configured with logical roles in the virtual infrastructure). In one example, the infrastructure mapping service may receive information about virtualized infrastructure resources in response to a query issued to the control plane of the service provider environment for control plane data identifying a set of virtualized infrastructure resources associated with an account of the service provider environment. The infrastructure mapping service may also receive input data, provided for the account, which adds, modifies, or removes virtualized infrastructure resources in the control plane data associated with the account.

Additionally, the infrastructure mapping service may ingest segmentation data which describes one or more application dataflows. An application dataflow may include a model of a "flow" of data in the virtualized infrastructure and describe: the data involved in the flow, the producers or the consumers of the data, the stores that hold the data, and the configuration of the producers, consumers, stores of the data. An application dataflow may be described using a swim lane model. The infrastructure mapping service may receive information that describes how an application dataflow is secured into a swim lane. Micro-segmentation in the swim lane model may allow network traffic generated by different applications to be separated from each other and may reduce the risk of attack from another application. Accordingly, the actual controls within the control plane data of the virtualized infrastructure that are used by the control plane of the service provider environment to enforce segmentation and security of the virtualized infrastructure may be deduced from how the application dataflow is secured into a corresponding swim lane.

According to one example of the present technology, an application dataflow may also be described with respect to a virtualized infrastructure resource, such as virtual executable resources, virtualized data stores, virtualized services, virtual network interfaces, and other virtual networking components. For example, the application dataflow may identify the virtual network interfaces that handle a flow of network traffic, whether the virtual network interface is the source or destination of the network traffic, a network address, network port, a network protocol (e.g., a layer 2, 3 or application protocol) configuration which the virtual network interface uses to send or receive the network traffic, one or more policies or restrictions (e.g., allow or deny) that apply to the network traffic, and the like.

According to the present technology, the infrastructure mapping service may use information in the control plane data that identifies and describes one or more virtualized infrastructure resources and information that describes the application dataflows in the virtualized infrastructure to generate a map of the virtualized infrastructure. In one example of the present technology, the infrastructure mapping service may generate a map of the virtualized infrastructure in the form of a graph with nodes that correspond to the virtualized infrastructure resources, such as computing instances and/or virtual network interfaces, and edges that correspond to the application dataflows. The graph generated by the infrastructure mapping service may provide a visual representation for an auditor or engineer to analyze or view. The graph generated by the infrastructure mapping service may enable the auditor or engineer to understand the virtualized infrastructure more readily than directly querying the control plane or graphical console of the service provider environment for the control plane data associated with the virtualized infrastructure. In addition, the graph generated by the infrastructure mapping service may be stored in a graph database providing quicker access to a representation or abstraction of the virtualized infrastructure than that typically offered through the control plane or graphical console of the service provider environment.

The infrastructure mapping service may generate graphs of virtualized infrastructures in the service provider environment that represent a source of truth (e.g., a single or preferred source) for the virtualized infrastructures within the service provider environment. For example, a graph of a virtualized infrastructure may be a preferred (or single) source of truth from which the configurations for deploying the virtualized infrastructure resources associated with the virtualized infrastructure may be obtained from the representations of the virtualized infrastructure resources and the application dataflows. In another example, the graph of the virtualized infrastructure may be the source of truth against which the configurations of the virtualized infrastructure resources in a deployed instance of the virtualized infrastructure may checked and validated. In a further example, the graph of the virtualized infrastructure may be the source of truth for auditing compliance and security of the virtualized infrastructure.

In various examples of the present technology, the infrastructure mapping service may provide access to graphs of virtualized infrastructures to facilitate configuration and deployment of the virtualized infrastructures in a service provider environment. For example, the infrastructure mapping service may provide an application programming interface (API) that may be used by an infrastructure design application to create and display a graph of a virtualized infrastructure. The infrastructure design application may provide a user interface through which an account of the service provider environment may visually edit a design of the virtualized infrastructure, for example, prior to, during, or after deployment. The infrastructure design application may send the information that identifies the virtualized infrastructure resources and the application dataflows in the virtualized infrastructure to the infrastructure mapping service to generate the graph.

In another example, the infrastructure mapping service may provide an API to be used by an infrastructure deployment service of the service provider environment to configure, modify, and/or deploy the virtualized infrastructure onto physical hosts and physical networking devices. The infrastructure deployment service may request the graph of the virtualized infrastructure from the infrastructure mapping service. The graph of the virtualized infrastructure may be used directly (or indirectly by being translated into a template used by the infrastructure deployment service) to configure the virtualized infrastructure resources in an instance of the virtualized infrastructure according to the representations of the virtualized infrastructure resources and the application dataflows in the graph. For example, a set of nodes associated with the graph may include values, settings, annotations, or other metadata used to set one or more parameters of corresponding virtualized infrastructure resources, such as computing instances, virtual network interfaces, and physical networking devices. A set of edges corresponding to the application dataflows as found between nodes in the graph may include values, settings, annotations, or other metadata used to set one or more parameters of corresponding virtualized infrastructure resources involved in the flow of the network traffic in the virtualized infrastructure. An individual application dataflow may include a collection of edges.

Accordingly, the set of nodes and edges associated with the graph may be used to derive configurations for the virtualized infrastructure components from the associated values, settings, annotations, or other metadata in the graph. In one example, a network control point at an individual virtual network interface or a firewall, may be configured using a configuration derived from the graph with the values, settings, annotations, or other metadata in the graph of a node corresponding to the network control point and one or more application dataflows that involve the corresponding node. In another example, a security group with a firewall rule may be established using a configuration derived from the graph. In yet another example, a network access control list (NACL) may be established using a configuration derived from the graph. In further examples, a configuration may be derived from the graph to set a media access control (MAC) address, an Internet Protocol (IP) address, a source or destination check flag, and the like.

In further examples of the present technology, the infrastructure mapping service may provide access to the graph of the virtualized infrastructure to facilitate auditing, compliance and security of the virtualized infrastructure. The infrastructure mapping service may provide an API to be used by an infrastructure auditing service of the service provider environment. The infrastructure auditing service may audit the control plane data of an instance of the virtualized infrastructure in the service provider environment using the graph as a preferred source of truth for configuring the virtualized infrastructure, for example, by checking or monitoring configurations of virtualized infrastructure resources in the control plane data and comparing the settings in control plane data to configurations derived from the representations of the virtualized infrastructure resources and application dataflows in the graph. The infrastructure auditing service may use the comparison with the graph of the virtualized infrastructure to validate a change in the control plane data for the configuration of the virtualized infrastructure resources which is not reflected in the graph. The infrastructure auditing service may allow or deny the change in the control plane data of the instance of the virtualized infrastructure in response to analyzing the graph.

In yet another example, the infrastructure auditing service may audit the graph of the virtualized infrastructure as the single source of truth for instances of the virtualized infrastructure in the service provider environment, for example, to determine whether an instance of the virtualized infrastructure deployed in the service provider environment includes configurations of virtualized infrastructure resources that comply with an audit or compliance rule. The audit rule may define a condition to be enforced within the virtualized infrastructure. Rather than auditing the control plane data of every instance of the virtualized infrastructure deployed in the service provider environment, the infrastructure auditing service may instead audit the graph of the virtualized infrastructure to determine, for example, whether a configuration of a virtualized infrastructure resource represented in the graph and involved in the application dataflows satisfies the audit rule.

The infrastructure auditing service may also monitor changes to the graph of the virtualized infrastructure for a change to a representation of a virtualized infrastructure resource or application dataflow to validate whether the graph remains in compliance with the condition of the audit rule. The infrastructure auditing service may allow or deny the change to the graph that does not comply with the condition in the audit rule. Furthermore, the infrastructure auditing service may recommend a change to the virtualized infrastructure resources or the application dataflows, for example, when the virtualized infrastructure resources or the application dataflows are configured with settings that are overly restrictive or not restrictive enough when compared to the audit rule.

In a further example, the infrastructure auditing service may audit the security of an instance of the virtualized infrastructure in the service provider environment using the graph, for example, by monitoring an audit or security log associated with a virtualized infrastructure resource. The infrastructure auditing service may compare the operation of the virtualized infrastructure resource evidenced, for example, in a record of network traffic found in the security log to an expected set of one or more operations derived from analyzing the graph. The infrastructure auditing service may identify a new, uncontrolled, or potentially hostile flow of network traffic in response to analyzing the graph and the security log. The infrastructure auditing service may identify, score, and categorize uncontrolled network traffic identified in the instance of the virtualized infrastructure using the graph and provide recommendations for handling the uncontrolled network traffic. The infrastructure auditing service may also preemptively terminate the flow of the uncontrolled network traffic in the instance of the virtualized infrastructure.

Therefore, mapping virtualized infrastructure resources and associated application dataflows in a virtualized infrastructure using a graph provides a more simplified technical structure to model the configuration of the virtualized infrastructure and secure application dataflows into swim lanes than used in a traditional network. In addition, a graph of a virtualized infrastructure according to examples of the present technology may provide both a visual diagram, to represent the virtualized infrastructure resources and application dataflows in a way that an auditor or engineer may more readily understand than by accessing the control plane data in the service provider environment, and a model that is portable to other service provider environments as a canonical representation of the virtualized infrastructure. The graph may be readily parsed in a virtualized infrastructure templating language that then may be used to create, manage, and audit an instance of the virtualized infrastructure in the service provider environments.

FIG. 1 illustrates a system 100 and related operations that may manage virtualized infrastructures using infrastructure maps according to an example of the present technology. The system 100 may be capable of management and delivery of computing, storage, and networking capacity as a software service for a community of end recipients. The system 100 may offer computers as physical machines and other physical devices for use in supplying virtualized infrastructure resources in the virtualized infrastructures. In this example, the system 100 may include an infrastructure mapping service 102, an infrastructure deployment service 104, an infrastructure management service 106, and a virtualized infrastructure 108.

The infrastructure mapping service 102 may include one or more computing systems, such as server computers, configured for creating, designing, editing, and storing a map 110 of the virtualized infrastructure 108. The infrastructure mapping service 102 may receive information describing one or more virtualized infrastructure resource(s) 112 to generate the map 110. The infrastructure mapping service 102 may receive control plane data describing the virtualized infrastructure resource(s) 112 from a control plane of a service provider environment implementing the system 100. In another example, the infrastructure mapping service 102 may receive segmentation data provided by an account associated with the virtualized infrastructure resource(s) 112.

The virtualized infrastructure resource(s) 112 may include virtualized executable resources, virtualized storage resources, virtual network interfaces, and other virtualized networking components. Some examples of the virtualized executable resources may include computing instances, containers (e.g., Kubernetes), compute functions, hosted applications, and the like. Some examples of the virtualized storage services may include database services, block storage services, content-delivery services, and the like. Some examples of the virtualized networking components may include virtualized networking devices and physical network devices (i.e., routers, firewalls, load-balancers, etc.) configured with logical roles in the virtual infrastructure 108.

The virtualized infrastructure resource(s) 112 may be represented in the control plane data and/or the segmentation data obtained by the infrastructure mapping service 102 using resource objects having a set of attributes. A resource object of the virtualized infrastructure resource(s) 112 may include a textual and/or binary specification of a corresponding virtualized infrastructure resource. The resource specification of a resource object may be formatted using a document, such as a JavaScript Object Notation (JSON) document, a Yet Another Markup Language (YAML) document, an eXtensible Markup Language (XML) document, or another document for storing attributes. The resource specification may include a set of attributes expressed as key-value pairs, where the key may be a number, a character, or a string, and the like, and the value may be a number, a character, a string, another object having another set of attributes, and the like.

In one example, the resource specification may indicate a type of virtualized infrastructure resource (e.g., a computing instance, a hosted application, a database instance, a storage instance, etc.). The resource specification may further indicate a type of physical host or physical networking device to implement the virtualized infrastructure resource and where the virtualized infrastructure resource (or resource) may be physically located, such as in a given region, datacenter, zone, or rack of the system 100. The resource specification may further indicate any physical hardware and associated configuration parameters to be utilized with the resource. For example, the resource specification may describe an allocation of processors, cores, memory, dedicated or temporary storage, attached input/output (I/O) devices, attached peripheral devices, media access control (MAC) addresses of virtual network interfaces, Internet Protocol (IP) addresses of virtual network interfaces, firewall settings, routing tables, ports and port settings, a machine image providing an operating system and applications, block volumes and network devices to be mounted, security and restrictions for users, groups, systems, and the like.

Some users may prefer not to manually configure the attributes of the virtualized infrastructure resource(s) 112. In particular, the likelihood of an error in the configuration of the attributes that enforce security within the virtualized infrastructure 108 may be greater with an increase in the number of the virtualized infrastructure resource(s) 112 in the virtualized infrastructure 108. Moreover, manually configuring the attributes of the virtualized infrastructure resource(s) 112 reduces the ability to replicate an instance of the virtualized infrastructure 108 within the system 100 or migrate the virtualized infrastructure 108 to another provider.

According to the present technology, the infrastructure mapping service 102 may also receive information describing one or more application dataflow(s) 114 to generate the map 110. The application dataflow(s) 114 may describe networking interactions or data transport paths between virtualized executable resources, virtualized networking components, and other virtualized infrastructure resources in the virtualized infrastructure 108. For example, the application dataflow(s) 114 may describe how a virtual network interface handles network traffic. The application dataflow(s) 114 may describe what types of network traffic the virtual network interface is allowed to accept, forward, or send. The application dataflow(s) 114 may describe a source or destination of network traffic associated with the virtual network interface. In addition, the application dataflow(s) 114 may describe the applications that are allowed to generate the network traffic handled by the virtual network interface, the ports that are opened or closed on the virtual network interface, bandwidth restrictions, security groups, firewall rules, network access control lists (NACLs), routing tables, gateways that connect the virtualized infrastructure 108 to publicly accessible networks, transits that connect the virtualized infrastructure 108 to private networks, subnets, and the like.

The application dataflow(s) 114 may be represented in the segmentation data obtained by the infrastructure mapping service 102 by dataflow objects having a set of attributes. A dataflow object of the application dataflow(s) 114 may include a textual and/or binary specification of an application dataflow. The dataflow specification may be formatted using a document, such as a JSON document, a YAML document, or an XML document. The dataflow specification may include a set of attributes expressed as key-value pairs, where the key may be a number, a character, or a string, and the like, and the value may be a number, a character, a string, another object having another set of attributes, and the like.

Therefore, the infrastructure mapping service 102 may use the information describing the virtualized infrastructure resource(s) 112 and the application dataflow(s) 114 to generate the map 110. The map 110 may include a collection of relationships expressed by the application dataflow(s) 114 between the virtualized infrastructure resource(s) 112. For example, the map 110 may form a graph of the virtualized infrastructure 108 with a set of nodes representing the virtualized infrastructure resource(s) 112 and associated configurations and a set of edges representing the application dataflow(s) 114 and additional configurations to implement the relationships between the virtualized infrastructure resource(s) 112.

As illustrated in FIG. 1, the map 110 includes a node "User" representing a user device, a node "Server" representing a web server, a node "MySQL" representing a database server, and a node "Bastion" host representing a security hardened device. The map 110 further includes an edge "HTTPS" between the node "User" and the node "Server," an edge "MySQL" between the node "Server" and the node "MySQL," an edge "SSH" between the node "User" and the node "Bastion," an edge "SSH" between the node "Bastion" and the node "Server," and an edge "MySQL" between the node "Bastion" and the node "MySQL."

Referring again to FIG. 1, the infrastructure deployment service 104 may include one or more computing systems, such as server computers, configured to use the map 110 to instantiate all or part of the virtualized infrastructure 108 in the system 100. The infrastructure deployment service 104 may identify one or more physical host(s) 120 and one or more physical networking device(s) 122 to use for the virtualized infrastructure 108. Some examples of the physical host(s) 120 are server computers, embedded computers, Internet of Things (IoT) devices, and other physical devices with logical roles within the virtualized infrastructure 108 that may be used to host one or more virtualized executable resource(s) 130 and virtual network interface(s) 132. Some examples of the physical networking device(s) 122 are routers, switches, firewalls, load-balancers, caching services, server computers, embedded devices, and other physical networking devices that may be used with logical roles within the virtualized infrastructure 108 as one or more virtualized networking component(s) 140.

In one example, the infrastructure deployment service 104 may receive an instruction to instantiate the virtualized infrastructure 108 in the system 100. In response to the instruction, the infrastructure deployment service 104 may obtain the map 110, for example, from a map database, such as a graph database that uses graph structures for semantic queries with nodes, edges, and properties to represent and store data. The infrastructure deployment service 104 may derive configurations for the virtualized executable resource(s) 130, the virtual network interface(s) 132, and the virtualized networking component(s) 140 from the map 110. The infrastructure deployment service 104 may set properties of the virtualized executable resource(s) 130, the virtual network interface(s) 132, and the virtualized networking component(s) 140 using the configurations derived from the map 110. The infrastructure deployment service 104 may use the configurations obtained from the map 100 to directly set the properties of the virtualized executable resource(s) 130, the virtual network interface(s) 132, and the virtualized networking component(s) 140. In another example, the infrastructure deployment service 104 may translate the map 110 to set the properties of the virtualized executable resource(s) 130, the virtual network interface(s) 132, and the virtualized networking component(s) 140. For example, the infrastructure deployment service 104 may translate the map 110 into a representation of the virtualized infrastructure in the form of a template file expressed in a templating language for building and instantiating virtualized infrastructures in the system 100. The template file may be parsed by components of the infrastructure deployment service 104 or the infrastructure management service 106 to implement the configurations derived from the map 110 in the virtualized infrastructure 108.

The infrastructure management service 106 may include one or more computing systems, such as server computers, configured to use the map 110 to manage all or part of the virtualized infrastructure 108 in the system 100. In one example, the infrastructure management service 106 may receive an instruction to monitor the virtualized infrastructure 108 in the system 100. In response to the instruction, the infrastructure management service 106 may obtain the map 110, for example, from a map database. The infrastructure management service 106 may compare a current configuration of the virtualized infrastructure 108 to a configuration derived from the map 110. The infrastructure management service 106 may determine whether properties of the virtualized executable resource(s) 130, the virtual network interface(s) 132, and the virtualized networking component(s) 140 are different from the configurations derived from the map 110. The infrastructure management service 106 may enforce settings in the virtualized infrastructure 108 using the configuration derived from the map 110. In another example, the infrastructure management service 106 may validate changes made to the current configuration of the virtualized infrastructure 108 against the configuration derived from the map 110.

According to one example of the present technology, the map 110 may be also used to perform analytics and audits with respect to the virtualized infrastructure 108. The map 110, for example, may be used to monitor whether the virtualized infrastructure 108 complies with a compliance or audit rule. The map 110 may be used to validate whether configurations of the virtualized executable resource(s) 130, the virtual network interface(s) 132, and the virtualized networking component(s) 140 comply with the audit rule. Furthermore, the map 110 may be used to provide a recommendation to change the configurations of the virtualized executable resource(s) 130, the virtual network interface(s) 132, and the virtualized networking component(s) 140, for example, when configured with settings that are overly restrictive or not restrictive enough in view of the audit rule.

In a further example, the map 110 may be used to identify a new, uncontrolled, and potentially hostile flow of network traffic in the virtualized infrastructure 108. For example, the map 110 may be used to monitor an audit or security log associated with the virtualized executable resource(s) 130, the virtual network interface(s) 132, and the virtualized networking component(s) 140. A comparison may be made between the operation of the virtualized executable resource(s) 130, the virtual network interface(s) 132, and the virtualized networking component(s) 140 evidenced in the security log to an expected operation derived from the map 110. The comparison may identify new, uncontrolled, or potentially hostile network traffic. The uncontrolled network traffic may be identified, scored, and categorized to provide recommendations for handling the uncontrolled network traffic.

Therefore, the map 110 provides a technical structure to model the configurations of the virtualized executable resource(s) 130, the virtual network interface(s) 132, and the virtualized networking component(s) 140 and secure the flow of network traffic in the virtualized infrastructure 108. A designer may quickly segment the flow of network traffic between the virtualized executable resource(s) 130, the virtual network interface(s) 132, and the virtualized networking component(s) 140 into swim lanes by expressing relationships between the virtualized executable resource(s) 130, the virtual network interface(s) 132, and the virtualized networking component(s) 140 as the application dataflow(s) 114 in the map 110. In addition, the map 110 provides both a visual diagram to represent the virtualized infrastructure resource(s) 112 and application dataflow(s) 114 in a way that is clearer for an auditor or engineer to understand from the original resource objects used to describe the virtualized infrastructure resource(s) 112. Furthermore, the map 110 may be portable and readily used directly or parsed in a templating language to create, manage, and audit an instance of the virtualized infrastructure 108 in the system 100.

Figure 2:
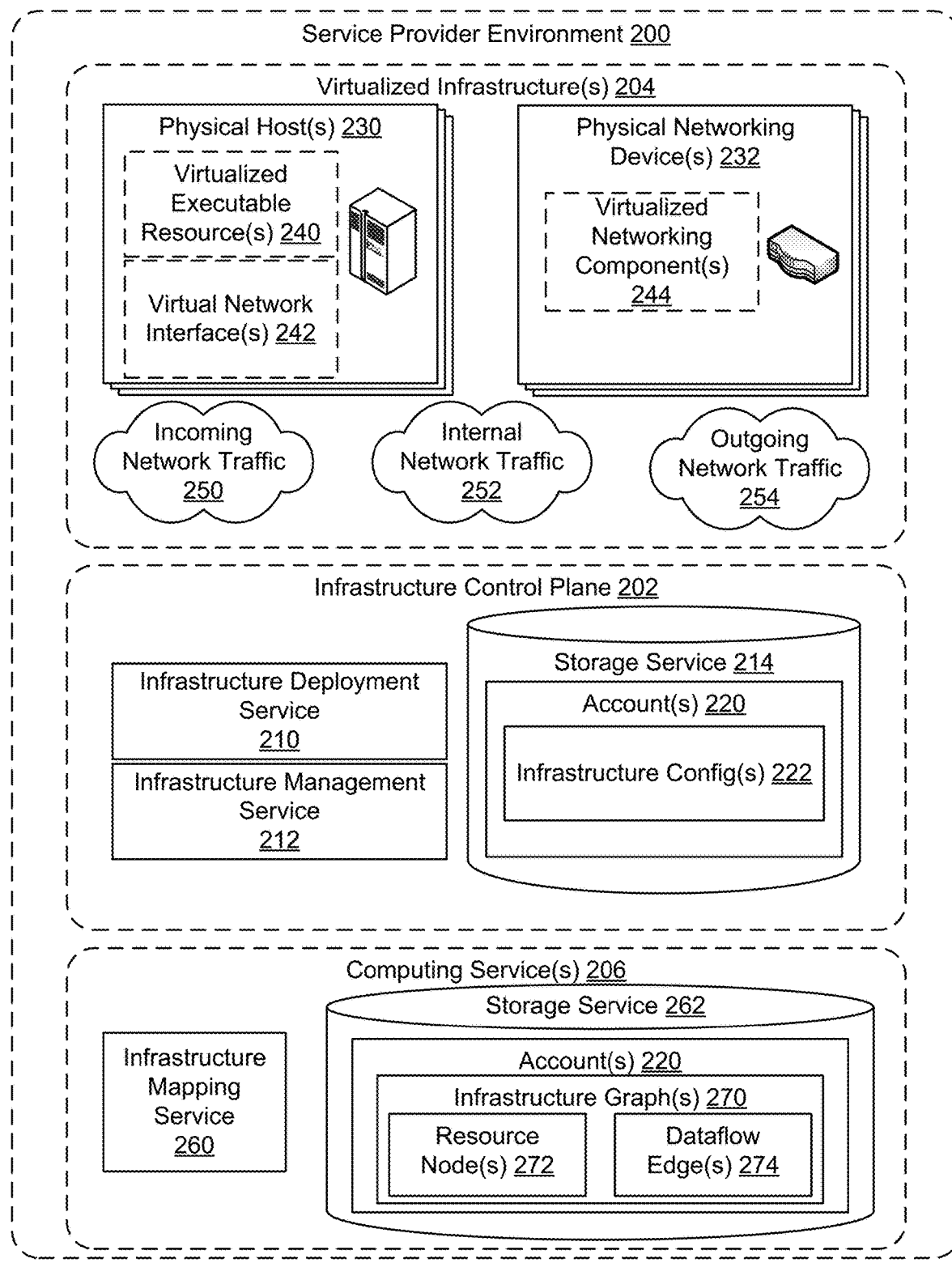
FIG. 2 is a block diagram illustrating an example service provider environment for managing virtualized infrastructures using infrastructure maps according to an example of the present technology.

FIG. 2 is a block diagram illustrating an example service provider environment 200 for managing virtualized infrastructures using infrastructure maps according to an example of the present technology. In this example, the service provider environment 200 may be capable of delivery of computing, storage, and networking capacity as a software service to a community of end recipients. In one example, the service provider environment 200 may be established for an organization by or on behalf of the organization. That is, the service provider environment 200 may offer a "private cloud environment." In another example, the service provider environment 200 may support a multi-tenant environment, wherein a plurality of customers may operate independently (i.e., a public cloud environment). Generally speaking, the service provider environment 200 may provide the following models: Infrastructure as a Service ("IaaS") and/or Software as a Service ("SaaS"). Other models may be provided. For the IaaS model, the service provider environment 200 may offer computers as physical or virtual machines and other physical devices for use as virtualized infrastructure resources in the virtual infrastructures.

Application developers may develop and run their software solutions on the service provider environment 200 without incurring the cost of buying and managing the underlying hardware and software. The SaaS model allows installation and operation of application software in the service provider environment 200. End customers may access the service provider environment 200 using networked client devices, such as desktop computers, laptops, tablets, smartphones, etc., running web browsers or other lightweight client applications, for example. The service provider environment 200 may include a number of computing devices that are arranged, for example, in one or more server banks or computer banks or other arrangements. The computing devices may support a computing environment using hypervisors, virtual machine managers (VMMs), and other virtualization software. In this example, the service provider environment 200 may include an infrastructure control plane 202 (or simply control plane) to manage and implement one or more virtualized infrastructure(s) 204 and one or more computing service(s) 206.

The infrastructure control plane 202 may include one or more computing systems, such as server computers, configured for deploying and managing the virtualized infrastructure(s) 204. The infrastructure control plane 202 may also include one or more computing systems that deploy and manage the computing service(s) 206. The infrastructure control plane 202 may include an infrastructure deployment service 210, infrastructure management service 212, and a storage service 214. The storage service 214 may include information related to one or more account(s) 220 of the service provider environment 200. The storage service 214 may store one or more infrastructure configuration(s) 222 for the account(s) 220.

The infrastructure deployment service 210 may include one or more computing systems, such as server computers, configured for deploying the virtualized infrastructure(s) 204 using the infrastructure configuration(s) 222 associated with the account(s) 220. The infrastructure deployment service 210 may receive instructions authorized by an account in the account(s) 220 to instantiate all or part of a virtualized infrastructure. In response to the instruction, the infrastructure deployment service 210 may retrieve, from the storage service 214, an infrastructure configuration in the infrastructure configuration(s) 222 corresponding to the virtualized infrastructure. The infrastructure deployment service 210 may use the infrastructure configuration(s) 222 in the corresponding infrastructure configuration to deploy resources in the virtualized infrastructure.

The infrastructure configuration(s) 222 may be represented, for example, by the following JSON formatted resource objects:
{
  "Type": "Virtualized infrastructure resource",
  "Properties": {
    "InstanceType": String
  },
},
{
  "Type": "Virtualized networking component",
  "Properties": {
    "Ipv6Addresses": [Ipv6Address, ... ],
    "PrivateIpAddress": String,
    "SourceDestCheck": Boolean,
    "SubnetId": String,
    "CidrIp": String,
    "CidrIpv6": String,
    "Description": String,
    "FromPort": Integer,
    "GroupId": String,
    "GroupName": String,
    "IpProtocol": String,
    "SourcePrefixListId": String,
    "SourceSecurityGroupName": String,
    "SourceSecurityGroupId": String,
    "SourceSecurityGroupOwnerId": String,
    "DestinationPrefixListId": String,
    "DestinationSecurityGroupId": String,
    "ToPort": Integer
    "Tags": [Resource Tag, ... ]
  }
}

The virtualized infrastructure(s) 204 may be instantiated using one or more physical host(s) 230 and one or more physical networking device(s) 232. The infrastructure configuration(s) 222 may be used to configure and deploy one or more virtualized executable resource(s) 240 and/or one or more virtual network interface(s) 242 with the physical hosts 230. The infrastructure configuration(s) 222 may also be used to configure the physical networking device(s) 232 for deployment in the virtual infrastructures as one or more virtualized networking component(s) 244. The infrastructure configuration(s) 222 may also configure the virtual network interface(s) 242 and the virtualized networking component(s) 244 to handle incoming network traffic 250, internal network traffic 252, and outgoing network traffic 254.

The infrastructure management service 212 may include one or more computing systems, such as server computers, configured for managing the virtualized infrastructure(s) 204 associated with the account(s) 220 after deployment. The infrastructure management service 212 may monitor active instances of the virtualized infrastructure(s) 204 for problems relating to operation, usage, security, and the like. The infrastructure management service 212 may enable accounts of the service provider environment 200 to make changes to active resources of the virtualized infrastructure(s) 204 and the infrastructure configuration(s) 222. For example, the infrastructure management service 212 may enable accounts of the service provider environment 200 to automatically scale, horizontally or vertically, resources of the physical host(s) 230 and/or physical networking device(s) 232 allocated for use by the virtualized infrastructure(s) 204 in response to demand. The infrastructure management service 212 may also provide to the accounts reporting and notification features that enable the accounts to visualize and quickly be informed of the status of the virtualized infrastructure(s) 204.

The computing service(s) 206 may be considered on-demand computing that are hosted in a server, virtualized service environment, grid or cluster computing system. Some examples of the computing service(s) 206 that may be provided by the service provider environment 202 may include compute services, data store services, networking services, web services, streaming services, network accessible services, software as a service, storage as a service, on-demand applications, services for the execution of code functions, and services associated with infrastructure mapping, such as the infrastructure mapping service 260 and the storage service 262. The storage service 262 may include information related to the account(s) 220 of the service provider environment 200. The storage service 262 may store one or more infrastructure graph(s) 270 for the account(s) 220.

According to one example of the present technology, the infrastructure mapping service 260 may enable the account(s) 220 (e.g., a user of one of the account(s) 220) to create, design, edit, manage, and utilize maps of some or all of the account's virtualized infrastructure(s) 204 in the form of the infrastructure graph(s) 270. The infrastructure graph(s) 270 may model the virtualized infrastructure(s) 204 using one or more application dataflows. For example, the infrastructure graph(s) 270 may model the virtualized infrastructure(s) 204 using one or more resource node(s) 272 and one or more dataflow edge(s) 274. The resource node(s) 272 may represent virtualized infrastructure resources (e.g., computing instances, services, code functions, datastores, etc.) in the virtualized infrastructure(s) 204. The dataflow edge(s) 274 may represent relationships involving application dataflows between the virtualized infrastructure resources in the virtualized infrastructure(s) 204.

In one example, the resource node(s) 272 may include identifiers (e.g., resource IDs) that correspond to virtualized infrastructure resources in the virtualized infrastructure(s) 204. The resource node(s) 272 may include identifiers that match identifiers included in the infrastructure configuration(s) 222 to refer to the same virtualized infrastructure resources. The resource node(s) 272 in the infrastructure graph 270 may also include values, settings, data, and the like, that may be directly used to set parameters of the attributes of the resource objects in the infrastructure configuration(s) 222. The resource node(s) 272 may also refer to other values, settings, data, metadata, and the like, from which parameters for the attributes of resource objects in the infrastructure configuration(s) 222 may be derived or computed and set.

The dataflow edge(s) 274 may represent relationships between the virtualized infrastructure resources in the virtualized infrastructure(s) 204 in the form of application dataflows. The dataflow edge(s) 274 may include identifiers that match identifiers included in the infrastructure configuration(s) 222 to refer to the same virtualized infrastructure resources. The dataflow edge(s) 274 may also include values, settings, data, and the like, that may be directly used to set parameters of the attributes of the resource objects in the infrastructure configuration(s) 222 that may be involved in the application dataflows. The dataflow edge(s) 274 may also refer to values, settings, data, metadata, and the like, that may be used to derive and set parameters of the attributes the resource objects in the infrastructure configuration(s) 222.

Therefore, a configuration of one or more virtualized infrastructure resources, such as a virtual network interface, may be computed and set from the resource node(s) 272 and the dataflow edge(s) 274. For example, a configuration may be computed from one or both of the resource node(s) 272 and the dataflow edge(s) 274 that sets the MAC address, the network address, open and closed network port, allowable network protocols, firewall rules, and the like, that segment network traffic associated with the virtual network interface into one or more swim lanes.

The infrastructure mapping service 260 may enable the account(s) 220 (e.g., a user of one of the account(s) 220) of the service provider environment 200 to create, design, and edit the infrastructure graph(s) 270 using a user interface. For example, the infrastructure mapping service 260 may provide, for example, a command line interface or a graphical user interface via which the accounts of the service provider environment 200 may enter and manipulate information describing the resource node(s) 272 and the dataflow edge(s) 274. The infrastructure mapping service 260 may enable the accounts of the service provider environment 200 to manually define virtualized infrastructure resources and application dataflows represented by the resource node(s) 272 and the dataflow edge(s) 274. In another example, infrastructure mapping service 260 may enable the accounts of the service provider environment 200 to query the infrastructure control plane 202 for the infrastructure configuration(s) 222 in control plane data to use as the virtualized infrastructure resources represented in the resource node(s) 272. Accordingly, the accounts of the service provider environment 200 may retrieve an existing configuration from the infrastructure configuration(s) 222 for one of the virtualized infrastructures 204 to use as a base to generate a corresponding graph in the infrastructure graph(s) 270.

In a further example, the infrastructure mapping service 260 may enable the accounts of the service provider environment 200 to utilize the infrastructure graph(s) 270 for ongoing maintenance and evaluation of the virtualized infrastructure(s) 204. Modifications may be made to the infrastructure graph(s) 270 by users of the accounts in the service provider environment 200. The infrastructure deployment service 210 and the infrastructure management service 212 may utilize the modifications to the infrastructure graph(s) 270 to derive and modify configurations for the virtualized infrastructure(s) 204.

The infrastructure deployment service 210 and the infrastructure management service 212 may keep the instances of the virtualized infrastructure(s) 204 in sync with the infrastructure graph(s) 270. For example, the infrastructure management service 212 may monitor the infrastructure graph(s) 270 for changes. The infrastructure management service 212 may modify the infrastructure configuration(s) 222 to reflect the changes to the infrastructure graph(s) 270. The infrastructure management service 212 may add, remove, or reconfigure virtualized infrastructure resources described in the infrastructure configuration(s) 222. The infrastructure management service 212 may also add, remove, or modify active instances of virtualized infrastructure resources, such as the virtualized executable resource(s) 240, the virtual network interface(s) 242, and the virtualized networking component(s) 244 in the virtualized infrastructures 204 to reflect the modifications to the infrastructure configuration(s) 222 resulting from the changes to the infrastructure graph(s) 270. The infrastructure deployment service 210 and the infrastructure management service 212 may also notify users of the accounts of the service provider environment 200 when the instances of the virtualized infrastructure(s) 204 have configurations that are different from configurations derived from the infrastructure graph(s) 270.

In another example, the infrastructure mapping service 260 may enable use of the infrastructure graph(s) 270 for auditing the virtualized infrastructure(s) 204. The users of the accounts may provide audit rules with conditions to be enforced in the virtualized infrastructure(s) 204. The audit rules may include conditions described in terms of technical, business, or regulatory requirements. For example, the conditions may specify a technical requirement between a particular version of an application and a particular version of an application library used by a virtualized infrastructure resource. In another example, the conditions may specify business or regulatory requirements, such as storage of personally identifiable information (PII) in a virtualized infrastructure resource shall limit accessibility to the data to users outside of a given organization or to the public.

The infrastructure graph(s) 270 may also be analyzed to determine whether the virtualized infrastructure(s) 204 satisfy the audit rules. For example, the infrastructure graph(s) 270 may be analyzed to determine whether configurations computed or derived for the virtualized infrastructure resources from the infrastructure graph(s) 270 satisfy the conditions defined by the audit rules. For example, a configuration computed from the infrastructure graph(s) 270 for one of the virtualized executable resource(s) 240 may not satisfy a condition defined by an audit rule to be enforced that a particular version of an application use a particular version of an application library. In another example, a configuration computed from the infrastructure graph(s) 270 for one of the virtualized executable resource(s) 240 may satisfy conditions that limit publicly accessible storage of PII. The analysis of the infrastructure graph(s) 270 may allow users of the account(s) 220 to be notified when the infrastructure graph(s) 270 fail to satisfy the audit rules and when instances of the virtualized infrastructure(s) 204 have configurations that are different from configurations derived from the infrastructure graph(s) 270 and potentially fail to satisfy the audit rules.

The infrastructure graph(s) 270 may further be used to audit a security log to determine security concerns in the virtualized infrastructure(s) 204. For example, the security log may be analyzed using the infrastructure graph(s) 270 to identify new, uncontrolled, and potentially hostile network traffic in the virtualized infrastructure(s) 204. The analysis of security logs using the infrastructure graph(s) 270 may allow the users of the account(s) 220 to be notified of the presence of uncontrolled network traffic in the virtualized infrastructure(s) 204.

Figure 3:
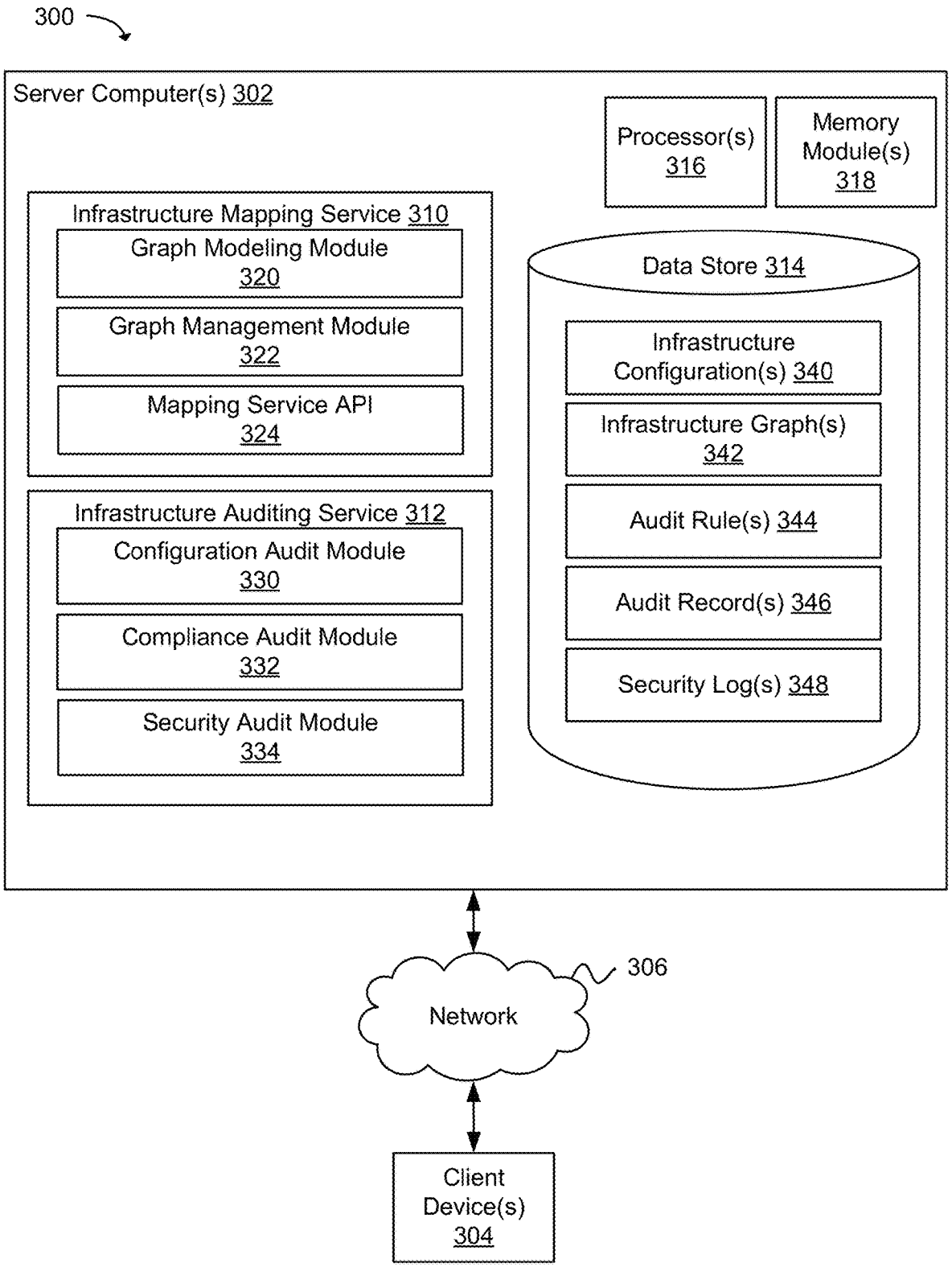
FIG. 3 illustrates various example components included in a system for infrastructure mapping according to one example of the present technology.

FIG. 3 illustrates various example components included in a system 300 for infrastructure mapping according to one example of the present technology. In this example, the system 300 may include one or more server computer(s) 302, one or more client device(s) 304, and a network 306. The server computer(s) 302 and the client device(s) 304 may communicate using the network 306. The server computer(s) 302 may include an infrastructure mapping service 310, an infrastructure auditing service 312, a data store 314, one or more processor(s) 316, and one or more memory module(s) 318. The infrastructure mapping service 310 may include a graph modeling module 320, graph management module 322, and a mapping service API 324. The infrastructure auditing service 312 may include a configuration audit module 330, a compliance audit module 332, and a security audit module 334. The data store 314 may include one or more infrastructure configuration(s) 340, one or more infrastructure graph(s) 342, one or more audit rule(s) 344, one or more audit record(s) 346, and one or more security log(s) 348.

The infrastructure mapping service 310 may receive information describing one or more virtualized infrastructure resources and relationships between the virtualized infrastructure resources in the form of application dataflows. For example, the configurations of the virtualized infrastructure resources and the application dataflows may be ingested by the infrastructure mapping service 310 from control plane data in the form of the infrastructure configuration(s) 240. The infrastructure mapping service 310 may automatically determine what virtualized infrastructure resources and dataflows are included in a virtualized infrastructure using the infrastructure configuration(s) 240. Additionally, a user (e.g., an account, operator, or administrator of the service provider environment) or service may interact with the graph modeling module 320 to define virtualized infrastructure resources and application dataflows in the virtualized infrastructure. In another example, the user or service may create a virtualized infrastructure resource or import the definitions of virtualized infrastructure resources and application dataflows from another source.

The virtualized infrastructure resources in the infrastructure configuration(s) 340 may be represented by resource objects having a set of attributes. In addition to the infrastructure configuration(s) 340, the graph modeling module 320 may provide an interface enabling the user or service to create and edit a resource object. As discussed above, the resource object may indicate a type of virtualized infrastructure resource (e.g., a computing instance, a hosted application, a database instance, a storage instance, etc.). The resource object may further indicate a type of physical host or networking device to implement the resource and where the resource may be physically located, such as in a given region, or zone of the service provider environment. The resource object may further indicate any physical and virtual hardware and associated configuration parameters to be utilized with the resource.

The application dataflows in the infrastructure configuration(s) 340 may be represented by dataflow objects having a set of attributes. In addition to the infrastructure configuration(s) 340, the graph modeling module 320 may provide an interface enabling the user or service to create and edit a dataflow object. As discussed above, the application dataflows may describe networking interactions between virtualized infrastructure resources, such as virtualized executable resources and virtualized networking components. For example, the application dataflow may describe a configuration of a virtual network interface for handling network traffic. The dataflow object may describe what network traffic the virtual network interface is allowed to accept, forward, or send. The dataflow object may describe a source or destination of network traffic associated with the virtual network interface. The dataflow object may describe the applications that are allowed to generate the network traffic handled by the virtual network interface, the ports that are opened or closed on the virtual network interface, bandwidth restrictions, security groups, firewall rules, network access control lists (NACLs), routing tables, gateways, transits, subnet, and the like. In addition to computing application dataflows using the infrastructure configuration(s) 340, the graph modeling module 320 may provide a user interface enabling the user to visually create and edit a dataflow object.

Therefore, the infrastructure mapping service 310 may automatically use the infrastructure configuration(s) 340 describing the virtualized infrastructure resources and the application dataflows to generate the infrastructure graph(s) 342. Additionally, a user or service may interact with the infrastructure mapping service 310 to add, remove, and modify the virtualized infrastructure resources and the application dataflows to generate the infrastructure graph(s) 342. Accordingly, the infrastructure graph(s) 342 may include a collection of relationships expressed by the application dataflows linking the virtualized infrastructure resources that may be used to manage corresponding virtualized infrastructures.

The graph management module 322 may provide an interface enabling a user (e.g., an account, operator, or administrator of the service provider environment) or service to manage the infrastructure graph(s) 342. The user or service may interact with the graph management module 322 to access the infrastructure graph(s) 342 to perform one or more management operations. The infrastructure mapping service 310 may provide a mapping service API 324 to enable the user or service to make API calls to the infrastructure mapping service 310, for example, to interact with the graph modeling module 320 and the graph management module 322.

The infrastructure auditing service 312 may use the infrastructure graph(s) 342 to perform a variety of audits. For example, the configuration audit module 330 may audit the current set of parameters expressed in the infrastructure configuration(s) 340 for infrastructure resources using the infrastructure graph(s) 342 to determine how the infrastructure configuration(s) 340 compare to configurations computed or derived from the infrastructure graph(s) 342. The configuration audit module 330 may also validate modifications to the infrastructure configuration(s) 340 using the infrastructure graph(s) 342 to ensure that the modification conform to configurations computed or derived from the infrastructure graph(s) 342.

In another example, the compliance audit module 332 may audit the infrastructure graph(s) 342 as the single or preferred source of truth as to the configurations expressed in the infrastructure configuration(s) 340 for infrastructure resources to determine whether the configurations computed or derived from the infrastructure graph(s) 342 comply with technical, business, and regulatory rules or restrictions. In yet another example, the security audit module 334 may audit security logs using the infrastructure graph(s) 342 to enforce the security of the infrastructure configuration(s) 340. The security audit module 334 may compare security logs to configurations computed or derived from the infrastructure graph(s) 342 to identify new, uncontrolled, and potentially hostile network traffic.

According to one example of the present technology, the configuration audit module 330 may compare the settings of the attributes of resources objects in the infrastructure configuration(s) 340 to the values, settings, and parameters computed or derived for the attributes from the infrastructure graph(s) 342. The configuration audit module 330 may periodically monitor the infrastructure configuration(s) 340 to detect any changes. Upon detecting a change, the infrastructure configuration(s) 340 may retrieve the infrastructure graph(s) 342 to make the comparison.

The configuration audit module 330 may validate modifications to the infrastructure configuration(s) 340 using the infrastructure graph(s) 342 and a set of validation rules. A validation rule may compare a parameter in the attributes of a virtualized resource in the infrastructure configuration(s) 340 to a parameter in the configuration of the virtualized infrastructure resource computed or derived from the infrastructure graph(s) 342. The validation rule may compare the parameters for equivalence, whether a threshold has been exceeded, whether one falls within a range of the other, and the like. The validation rule may also define an action to be performed when the comparison succeeds or fails. For example, the configuration audit module 330 may determine whether a change in the infrastructure configuration(s) 340 made to the configuration of a virtualized infrastructure resource is different from a configuration computed or derived from the infrastructure graph(s) 342 for the corresponding virtualized infrastructure resource. The configuration audit module 330 may use a validation rule to determine whether the change in the infrastructure configuration(s) 340 that provides greater security for the virtualized infrastructure resource than that in the configuration derived from the infrastructure graph(s) 342 may be allowed. In another example, configuration audit module 330 may user a validation rule to determine whether the change in the infrastructure configuration(s) 340 results in an application dataflow that may be overly restrictive or overly permissive.

The configuration audit module 330 may generate a notification indicating the results of the comparison. For example, the configuration audit module 330 may sent a notification to an account in the service provider environment. The notification may include an alert that a difference exists between the infrastructure configuration(s) 340 and the infrastructure graph(s) 342. The notification may identify any virtualized infrastructure resources that are configured differently from the infrastructure graph(s) 342. The configuration audit module 330 may send the notification via email, text message, instant message, a popup alert, and the like.

The configuration audit module 330 may also generate a recommendation to modify the infrastructure configuration(s) 340 to mitigate the difference. The recommendation may include one or more actions that may be taken with respect to the virtualized infrastructure resources of the infrastructure configuration(s) 340. For example, the configuration audit module 330 may generate a recommendation to allow or block network traffic, set or remove security permissions on storage resources, install anti-virus software on a computing instance, or remove an application. In a further example, the configuration audit module 330 may generate a recommendation to configure a virtual network interface to secure against uncontrolled network traffic. The configuration audit module 330 may include a textual or graphical element in the notification that enables, for example, the client device(s) 304 receiving of the notification to implement the proposed recommendation.

The compliance audit module 332 may include hardware and software elements configured to determine whether the infrastructure configuration(s) 340 and the infrastructure graph(s) 342 comply with technical, business, and regulatory rules or restrictions. The technical, business, and regulatory rules or restrictions may be expressed as the audit rule(s) 344 having conditions to be enforced within virtualized infrastructures. For example, the audit rule(s) 344 may include a condition specifying a technical requirement for using a particular version of an application as compared to a particular version of an application library. In another example, the audit rule(s) 344 may include a condition specifying a business requirement or regulatory requirement that personally identifiable information (PII) shall not be accessible outside of a given organization or to the public generally when stored.

The compliance audit module 332 may validate whether the infrastructure configuration(s) 340 and the infrastructure graph(s) 342 comply with the audit rule(s) 344. For example, the compliance audit module 332 may determine whether a change in the infrastructure configuration(s) 340 fails to comply with the audit rule(s) 344. In another example, the compliance audit module 332 does not have to examine the infrastructure configuration(s) 340. The compliance audit module 332 may analyze infrastructure graph(s) 342 to determine compliance with the audit rule(s) 344. For example, the compliance audit module 332 may evaluate whether the configurations derived from the infrastructure graphs(s) 342 satisfy the audit rule(s) 344.

The compliance audit module 332 may generate one or more audit record(s) 346 as a result of the compliance audit with the audit rule(s) 344. The compliance audit module 332 may generate a notification indicating the results of the compliance audit with the audit rule(s) 344. For example, the configuration audit module 330 may send a notification to an account in the service provider environment with the audit record(s) 346 attached. The notification may include an alert indicating the status of the infrastructure configuration(s) 340 and the infrastructure graph(s) 342 with respect to complying with the audit rule(s) 344. The notification may identify any virtualized infrastructure resources in the infrastructure configuration(s) 340 and the infrastructure graph(s) 342 that do not comply with the audit rule(s)

344. The configuration audit module 330 may send the notification via email, text message, instant message, a popup alert, and the like.

The compliance audit module 332 may also generate a recommendation to modify the infrastructure configuration(s) 340 and the infrastructure graph(s) 342 to satisfy the audit rule(s) 344. The recommendation may include one or more actions that may be taken with respect to the virtualized infrastructure resources of the infrastructure configuration(s) 340 and the infrastructure graph(s) 342. For example, the compliance audit module 332 may generate a recommendation to disable public access to a storage service that contains PII. The compliance audit module 332 may include a textual or graphical element in the notification that enables, for example the client device(s) 304 receiving of the notification to implement the proposed recommendation.

The infrastructure auditing service 312 may utilize the security audit module 334 to improve the security of the infrastructure configuration(s) 340 using the infrastructure graph(s) 342. The security audit module 334 may determine a difference between the infrastructure configuration(s) 340 and configuration derived from the infrastructure graph(s) 342. For example, the security audit module 334 may receive one or more security log(s) 348. The security audit module 334 may analyze new, uncontrolled, and potentially hostile network traffic in the security log(s) 348 that is different from the application dataflows defined in the infrastructure graph(s) 342. The infrastructure auditing service 312 may determine a set of expected attributes for network traffic handled by the identified virtualized infrastructure resources or application dataflows. The security audit module 334 may analyze bytes, words, packets, datagrams, frames, and the like, and portions thereof, such as values, fields, headers, and segments, and the like, in security log(s) 348 to determine whether flow of network traffic matches the set of expected attributes for network traffic handled by the identified virtualized infrastructure resources or application dataflows in the infrastructure graph(s) 342. The security audit module 334 may filter out matching network traffic for the virtualized infrastructure resources or application dataflows in the infrastructure graph(s) 342 when uncontrolled network traffic is identified.

The security audit module 334 may generate a notification indicating the results of the analysis of the security log(s) 348. For example, the security audit module 334 may send a notification to an account in the service provider environment. The notification may include an alert that describes the uncontrolled traffic identified using the infrastructure graph(s) 342. The notification may identify any virtualized infrastructure resources in the infrastructure configuration(s) 340 that are involved with the uncontrolled from the infrastructure graph(s) 342. The security audit module 334 may send the notification via email, text message, instant message, a popup alert, and the like.

The security audit module 334 may also generate a recommendation to modify the infrastructure configuration(s) 340 and the infrastructure graph(s) 342 to enhance security. The recommendation may include one or more actions that may be taken with respect to the virtualized infrastructure resources of the infrastructure configuration(s) 340 and the infrastructure graph(s) 342. For example, the security audit module 334 may generate a recommendation to block the uncontrolled network traffic. The security audit module 334 may include a textual or graphical element in the notification that enables, for example, the client device(s) 304 receiving of the notification to implement the proposed recommendation.

The various processes and/or other functionality contained within the system 300 may be executed on one or more processor(s) 316 that are in communication with one or more memory module(s) 318. The system 300 may include a number of computing devices that are arranged, for example, in one or more server banks or computer banks or other arrangements. The computing devices may support a computing environment using hypervisors, virtual machine monitors (VMMs) and other virtualization software.

The term "data store" may refer to any device or combination of devices capable of storing, accessing, organizing and/or retrieving data, which may include any combination and number of data servers, relational databases, object-oriented databases, cluster storage systems, data storage devices, data warehouses, flat files, and data storage configuration in any centralized, distributed, or clustered environment. The storage system components of the data store 314 may include storage systems such as a SAN (Storage Area Network), cloud storage network, volatile or non-volatile RAM, optical media, or hard-drive type media. The data store 314 may be representative of a plurality of data stores as can be appreciated.

The network 306 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
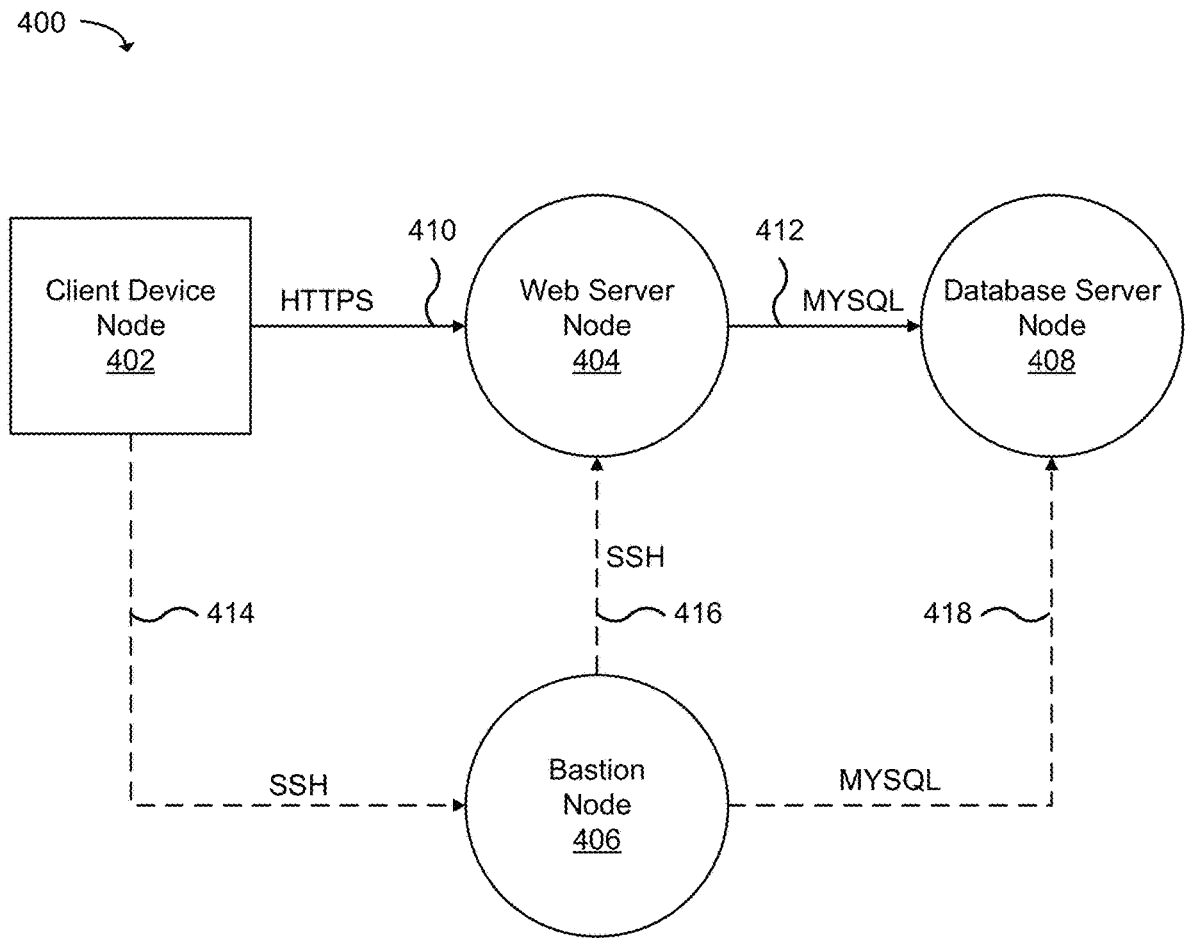
FIG. 4 illustrates an example infrastructure map in the form of a graph of a virtualized infrastructure that includes representations of virtualized infrastructure resources and application dataflows that represent segmentation of flows of network traffic between the virtualized infrastructure resources according to one example of the present technology.

FIG. 4 illustrates an example infrastructure map in the form of a graph 400 mapping virtualized infrastructure resources and application dataflows in a virtualized infrastructure according to one example of the present technology. The graph 400 includes a client device node 402 representing a user device, a web server node 404 representing a web server, a bastion node 406 representing a management device, and a database server node 408 representing a database server. The nodes 402, 404, 406, and 408 may be represented by resource objects associated with virtualized infrastructure resources. For example, the client device node 402 may be represented by a resource object that identifies a virtual network interface associated with a router or gateway through which the virtualized infrastructure may be accessed. The web server node 404, the bastion node 406, and the database server node 408 may be represented by resources objects that identify computing instances associated with various functions, such as a web stack, a database stack, and a management console.

The graph 400 further includes an edge 410 labeled "HTTPS" between the client device node 402 and the web server node 404, an edge 412 labeled "MySQL" between the web server node 404 and the database server node 408, an edge 414 labeled "SSH" between the client device node 402 and the bastion node 406, an edge 416 labeled "SSH" between the bastion node 406 and the web server node 404, and an edge 418 labeled "MySQL" between the bastion node 406 and the database server node 408. The edge 410 labeled "HTTPS" between the client device node 402 and the web server node 404 represent one or more parts of a first application dataflow (represented by solid black lines) specifying that the client device node 402 is allowed to send network traffic using the HTTPS protocol to the web server node 404. The edge 410 may also indicate that the web server node 404 is allowed to accept HTTPS network traffic from the client device node 402. The edge 412 labeled "MySQL" between the web server node 404 and the database server node 408 represent one or more parts of the first application dataflow indicating 1) that the web server node 404 is allowed to send network traffic using the MySQL protocol to the database server node 408 and/or 2) that the database server node 408 is allowed to accept MySQL network traffic from the web server node 404.

The edge 414 labeled "SSH" between the client device node 402 and the bastion node 406 represent one or more parts of a second application dataflow (represented by dashed black lines) indicating 1) that the client device node 402 is allowed to send network traffic using the SSH protocol to the bastion node 406 and/or 2) that the bastion node 406 is allowed to accept SSH network traffic from the client device node 402. The edge 416 labeled "SSH" between the bastion node 406 and the web server node 404 represent one or more parts of the second application dataflow indicating 1) that the bastion node 406 is allowed to send network traffic using the SSH protocol to the web server node 404 and/or 2) that the web server node 404 is allowed to accept SSH network traffic from the bastion node 406. The edge 418 labeled "MySQL" between the bastion node 406 and the database server node 408 represent one or more parts of the second application dataflow indicating 1) that the bastion node 406 is allowed to send network traffic using the MySQL protocol to the database server node 408 and/or 2) that the database server node 408 is allowed to accept MySQL network traffic from the bastion node 406.

Figure 5:
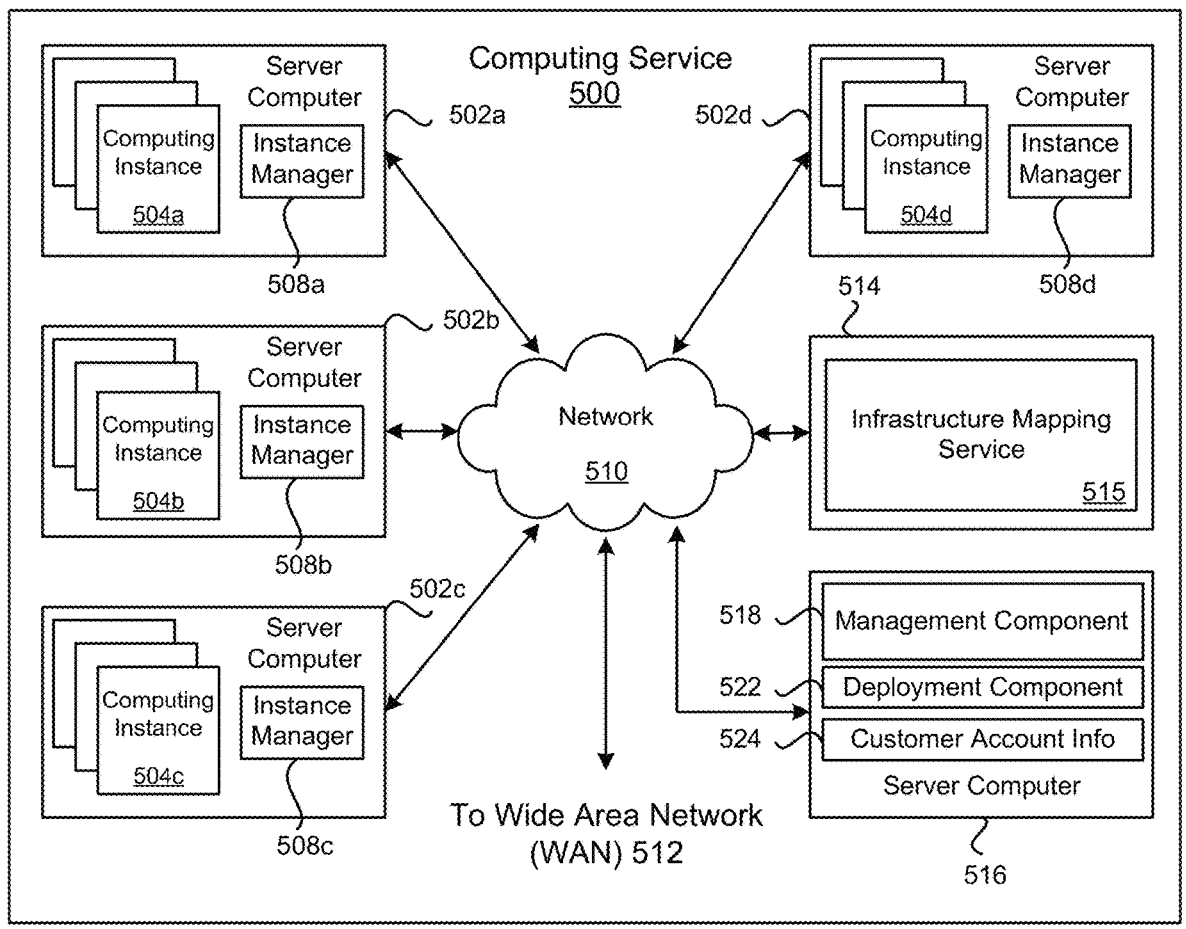
FIG. 5 is a block diagram that illustrates an example computing service that includes an infrastructure mapping service according to one example of the present technology.

FIG. 5 is a block diagram that illustrates an example computing service 500 that includes an infrastructure mapping service 515 according to one example of the present technology. The computing service 500 may be used to execute and manage a number of computing instances 504a-d upon which the present technology may execute. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage, and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of customers may operate independently (i.e., a public cloud environment). Generally speaking, the computing service 500 may provide the following models: Infrastructure as a Service ("IaaS"), and/or Software as a Service ("SaaS"). Other models may be provided. For the IaaS model, the computing service 500 may offer computers as physical or virtual machines and other resources. The virtual machines may be run as guests by a hypervisor, as described further below. In another configuration, the services model delivers computing that may include an operating system, programming language execution environment, database, and web server.

Application developers may develop and run their software solutions on the computing service without incurring the cost of buying and managing the underlying hardware and software. The SaaS model allows installation and operation of application software in the computing service 500. End customers may access the computing service 500 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502a-d. The server computers 502a-d may also be known as physical hosts. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine manager (VMM), or another type of program configured to enable the execution of multiple computing instances 504a-d on a single server. Additionally, each of the computing instances 504a-d may be configured to execute one or more applications.

A server computer 514 may be reserved to execute software components for implementing the present technology or managing the operation of the computing service 500 and the computing instances 504a-d. For example, the server computer 514 may execute an infrastructure mapping service 515 to perform edge computing management with multiple latency options.

A server computer 516 may execute a management component 518. A user may access the management component 518 to configure various aspects of the operation of the computing instances 504a-d purchased by a customer. For example, the user may setup computing instances 504a-d and make changes to the configuration of the computing instances 504a-d.

A deployment component 522 may be used to assist customers in the deployment of computing instances 504a-d. The deployment component 522 may have access to account information associated with the computing instances 504a-d, such as the name of an owner of the account, credit card information, country of the owner, etc. The deployment component 522 may receive a configuration from a user that includes data describing how computing instances 504*a-d* may be configured. For example, the configuration may include an operating system, provide one or more applications to be installed in computing instances 504*a-d*, provide scripts and/or other types of code to be executed for configuring computing instances 504*a-d*, provide cache logic specifying how an application cache is to be prepared, and other types of information. The deployment component 522 may utilize the user-provided configuration and cache logic to configure, prime, and launch computing instances 504*a-d*. The configuration, cache logic, and other information may be specified by a user accessing the management component 518 or by providing this information directly to the deployment component 522.

Customer account information 524 may include any desired information associated with a customer of the multi-tenant environment. For example, the customer account information 524 may include a unique identifier for a customer, a customer address, billing information, licensing information, customization parameters for launching instances, scheduling information, etc. As described above, the customer account information 524 may also include security information used in encryption of asynchronous responses to API requests. By "asynchronous" it is meant that the API response may be made at any time after the initial request and with a different network connection.

A network 510 may be utilized to interconnect the computing service 500 and the server computers 502*a-d*, 516. The network 510 may be a local area network (LAN) and may be connected to a Wide Area Network (WAN) 512 or the Internet, so that end customers may access the computing service 500. In addition, the network 510 may include a virtual network overlaid on the physical network to provide communications between the server computers 502*a-d*. The network topology illustrated in FIG. 5 has been simplified, as many more networks and networking devices may be utilized to interconnect the various computing systems disclosed herein.

Figure 6:
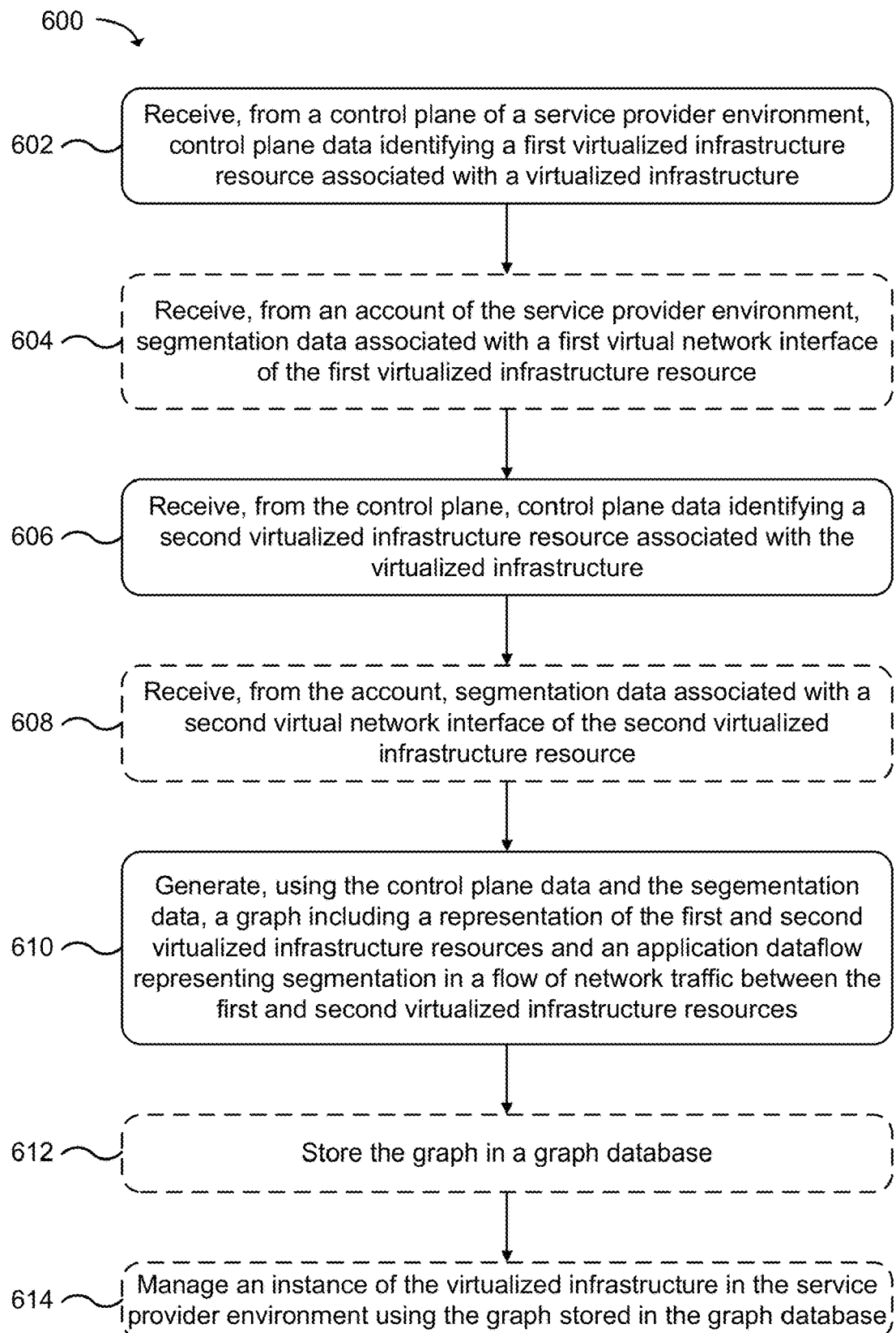
FIG. 6 is a flow diagram that illustrates an example method for generating an infrastructure map in the form of a graph of a virtualized infrastructure in a service provider environment that includes representations of virtualized infrastructure resources and application dataflows according to one example of the present technology.

FIG. 6 is a flow diagram that illustrates an example method 600 for generating an infrastructure map in the form of a graph of a virtualized infrastructure in a service provider environment that includes representations of virtualized infrastructure resources and application dataflows according to one example of the present technology. The method 600 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 602, a server computer may receive, from a control plane of the service provider environment, control plane data identifying a first virtualized infrastructure resource in a virtualized infrastructure in the service provider environment. The control plane data identifying the first virtualized infrastructure resource may include a resource object having a set of attributes in the form of key-value pairs. The following provides an example JSON formatted resource object:

{
  "Type": "Virtualized infrastructure resource",
  "Properties": {
    "InstanceType": String
  },
},
{
  "Type": "Virtualized networking component",
  "Properties": {
    "Ipv6Addresses": [Ipv6Address, . . . ],
    "PrivateIpAddress": String,
    "SourceDestCheck": Boolean,
    "SubnetId": String,
    "Tags": [Resource Tag, . . . ]
  }
}

The control plane data identifying the first virtualized infrastructure resource may also include segmentation data that defines a segmentation in a flow of network traffic handled by the first virtualized infrastructure resource. The segmentation data may include one or more settings for attributes of the resource object for the first virtualized infrastructure resource that segment the flow of network traffic into a swim lane. For example, the segmentation data may include values, settings, metadata, and the like for the attributes that configure the first virtualized infrastructure resource to use a specified network address, network port, firewall rule, and the like. The segmentation data may further specify applications that can send and receive data, the type of data that may be sent or received, restrictions on data content, and the like. In optional operation 604, the server computer may also receive, from an account of the service provider environment, segmentation data associated with a first virtual network interface of the first virtualized infrastructure resource. The server computer may use the segmentation data to configure a resource object for the first virtual network interface or to modify the resource object associated with the first virtualized infrastructure resource. The segmentation data may define a segmentation in a flow of network traffic handled by the first virtual network interface.

In operation 606, the server computer may receive, from the control plane of the service provider environment, control plane data identifying a second virtualized infrastructure resource associated with the virtualized infrastructure. The control plane data identifying the second virtualized infrastructure resource may also include segmentation data that defines a segmentation in a flow of network traffic handled by the second virtualized infrastructure resource. In optional operation 608, the server computer may also receive, from the account of the service provider environment, segmentation data associated with a second virtual network interface of the second virtualized infrastructure resource. The segmentation data may define a segmentation in a flow of network traffic handled by the second virtual network interface.

In operation 610, the server computer may generate, using the control plane data and the optional segmentation data, a graph including a representation of the first and second virtualized infrastructure resources and an application dataflow representing segmentation in a flow of network traffic between the first and second virtualized infrastructure resources. The graph may include a node for each of the first and second virtualized infrastructure resources in the virtualized environment. Accordingly, the graph may include a first node representing the first virtualized infrastructure resource (and/or the first virtual network interface corresponding thereto) and a second node representing the second virtualized infrastructure resource (and/or the second virtual network interface corresponding thereto). The server computer may generate representations each of the first and second virtualized infrastructure resources using the control plane data. The graph may also include one or more edges for each application dataflow in the virtualized environment between the first and second virtualized infrastructure resources as determined from the control plane data and/or the segmentation data for the first and second virtualized infrastructure resources and the first and second virtual network interfaces. The graph may include an edge between the first and second virtualized infrastructure resources representing the application dataflow between the first and second virtual network interfaces. The server computer may generate the application dataflow using the segmentation data.

The application dataflow may include a dataflow object having a set of attributes in the form of key-value pairs. The following provides an example JSON formatted dataflow object:

```
{
    "Type": "Application Dataflow",
    "Properties": {
        "CidrIp": String,
        "CidrIpv6": String,
        "Description": String,
        "FromPort": Integer,
        "GroupId": String,
        "GroupName": String,
        "IpProtocol": String,
        "SourcePrefixListId": String,
        "SourceSecurityGroupName": String,
        "SourceSecurityGroupId": String,
        "SourceSecurityGroupOwnerId": String,
        "DestinationPrefixListId": String,
        "DestinationSecurityGroupId": String,
        "ToPort": Integer
    }
}
```

In optional operation 612, the server computer may store the graph in a graph database. The relationships represented by the edges in the graph may allow data to be linked together directly, and in many cases retrieved with one query operation. Accordingly, persisting the graph in the graph database may allow faster querying of the relationships because they are perpetually stored within the database itself. A visual representation of the graph may include a set of nodes and edges as depicted in FIG. 4. The visual representation may include textual or graphical information that, for example, identifies a virtualized infrastructure resource or application dataflow and provides annotations or links to additional information about the resource or dataflow.

In optional operation 614, the server computer may manage (and/or deploy) an instance of the virtualized infrastructure in the service provider environment using the graph stored in the graph database. Management of the instance of the virtualized infrastructure may include deploying the virtualized infrastructure onto physical devices (e.g., launching computing instances), configuring initial and subsequent states for virtualized infrastructure resources by setting parameters derived from the graph, starting, stopping, and migrating virtualized infrastructure resources, and the like. In one example, the server computer may manage the configurations of the virtualized infrastructure using the graph in response to subsequent changes to the graph. In another example, the server computer may derive configurations for virtualized infrastructure resources and application dataflows from the graph to configure the virtualized infrastructure prior to or at the time an instance of the virtualized infrastructure is deployed onto physical hosts and networking devices.

Therefore, the server computer may obtain information that describes virtualized infrastructure resources and application dataflows to generate a graph that provides an auditor or engineer with a design from which the appropriate configuration of a virtualized infrastructure resource may be checked. The graph may further enable automatic management and consistent deployment of the virtualized infrastructure. The graph may further facilitate analytics on the virtualized infrastructure to improve the enforcement of compliance and detect security threats.

Figure 7:
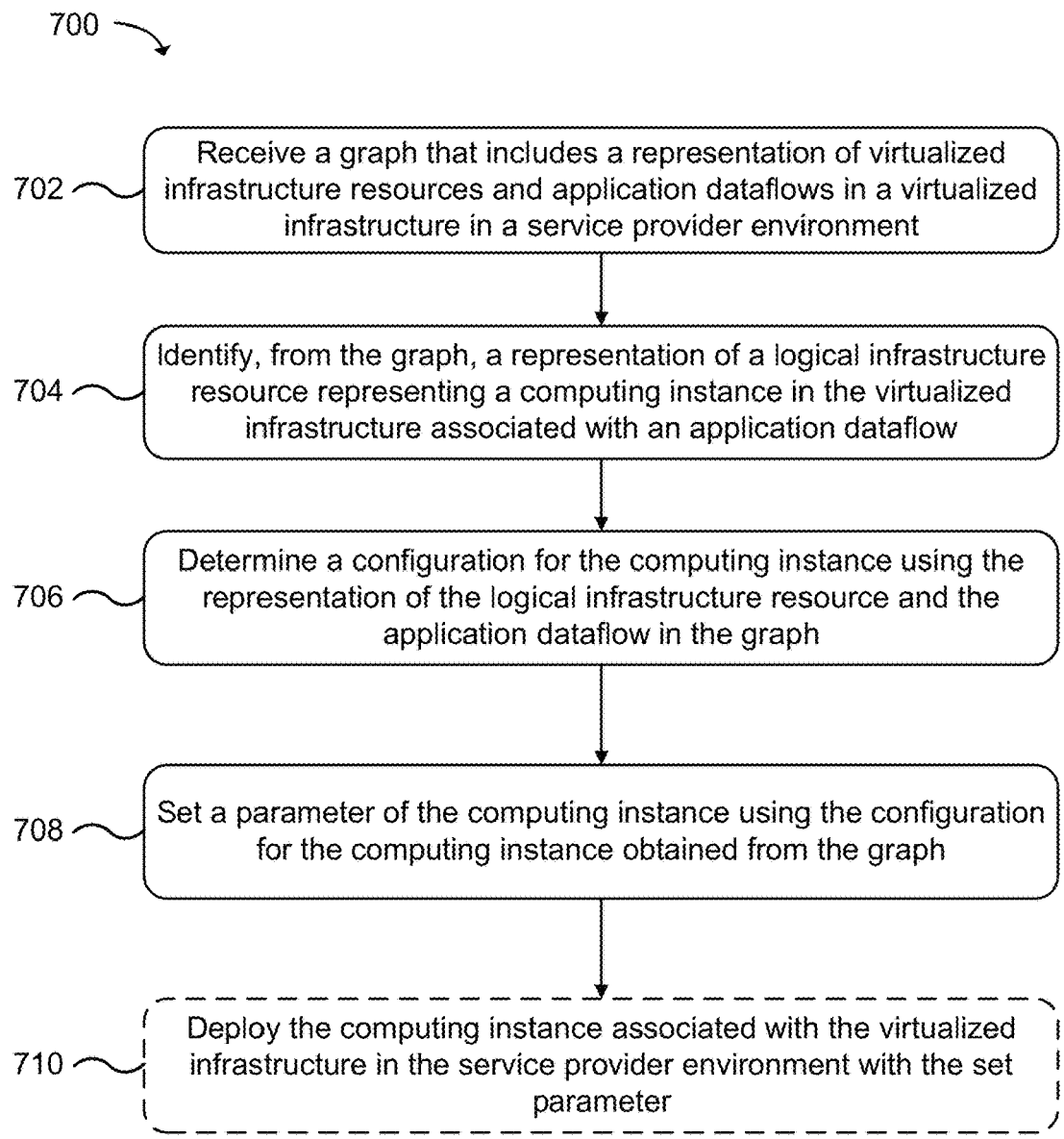
FIG. 7 is a flow diagram that illustrates an example method for setting parameters of virtualized infrastructure resources in a virtualized infrastructure of a service provider environment using a configuration determined from a graph of the virtualized infrastructure that includes representations of the virtualized infrastructure resources and application dataflows according to one example of the present technology.

FIG. 7 is a flow diagram that illustrates an example method 700 for setting parameters of virtualized infrastructure resources in a virtualized infrastructure of a service provider environment using a configuration determined from a graph of the virtualized infrastructure that includes representations of the virtualized infrastructure resources and application dataflows according to one example of the present technology. The method 700 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 702, a server computer or service in the service provider environment may receive a graph representing virtualized infrastructure resources and application dataflows in a virtualized infrastructure in the service provider environment. The graph may include a set of nodes that represent virtualized infrastructure resources in the virtualized infrastructure. The virtualized infrastructure resources may include virtualized executable resources, such as computing and storage instances, and virtualized networking components, such as virtual network interfaces and physical networking devices configured with logical roles in the virtual infrastructure. The graph may also include a set of edges that represent application dataflows. The application dataflows may describe how network traffic is handled between the virtualized infrastructure resources. The service computer may receive the graph from a text-based document, such as an eXtensible Markup Language (XML) document, from a graph database, and the like.

In operation 704, the server computer may identify, from the graph, a representation of a virtualized infrastructure resource representing a computing instance in the virtualized infrastructure associated with an application dataflow. The server computer may identify a node in the graph that corresponds to or otherwise identifies the computing instance. The node associated with the computing instance may be associated with a resource object in the control plane of the service provider environment having a set of attributes in the form of key-value pairs. The attributes of the computing instance may indicate an allocation of a number of processors, a memory allocation, a machine image storing an operating system and applications, and other parameters of the computing instance. The server computer may identify other nodes in the graph that correspond to or otherwise relate to the computing instance, for example, if there are one or more virtualized networking components (e.g., virtual network interfaces) attached to the computing instance.

In operation 706, the server computer may determine a configuration for the computing instance using the representation of the virtualized infrastructure resource and the application dataflow in the graph. The server computer may determine attributes, properties, annotations, metadata, and the like associated with the node in the graph corresponding to the computing instance to determine values and settings for parameters of the computing instance. The server computer may determine attributes, properties, annotations, metadata, and the like for other nodes in the graph that correspond to or otherwise relate to the computing instance, for example, if there are one or more virtualized networking components (e.g., virtual network interfaces) attached to the computing instance to determine values and settings for parameters of the computing instance. In addition, the server computer may determine attributes, properties, annotations, metadata, and the like associated with one or more edges in the graph that describe application dataflows that are connected to the nodes corresponding to the computing instance and the other virtualized networking components to determine values and settings for parameters of the computing instance.

In operation 708, the server computer may set a parameter of the computing instance in the virtualized infrastructure using the configuration for the computing instance obtained from the graph. For example, the server computer may set one or more parameters directly associated with the computing instance, such as a type of computing instance, a machine image, attached volumes, and other attributes. In another example, the server computer may set one or more parameters directly associated with the virtual network interface attached to the computing instance, such as a MAC address, an IP address, and/or a source/destination check flag. In yet another example, the server computer may set one or more parameters that involve the virtual network interface, such as ports that are open or closed, a security group having a firewall rule, bandwidth restrictions, load balancing rules, routing tables, and other networking services.

In optional operation 710, the server computer may deploy the computing instance within the virtualized infrastructure with the set parameter. According to one example of the present technology, the server computer may use the graph to generate an infrastructure template using a templating language. The server computer may translate the graph into a template file that may be used by a service in the service provider environment to interpret and instantiate the virtualized infrastructure. Therefore, the server computer may use the graph for automatic management and consistent deployment of the virtualized infrastructure.

Figure 8:
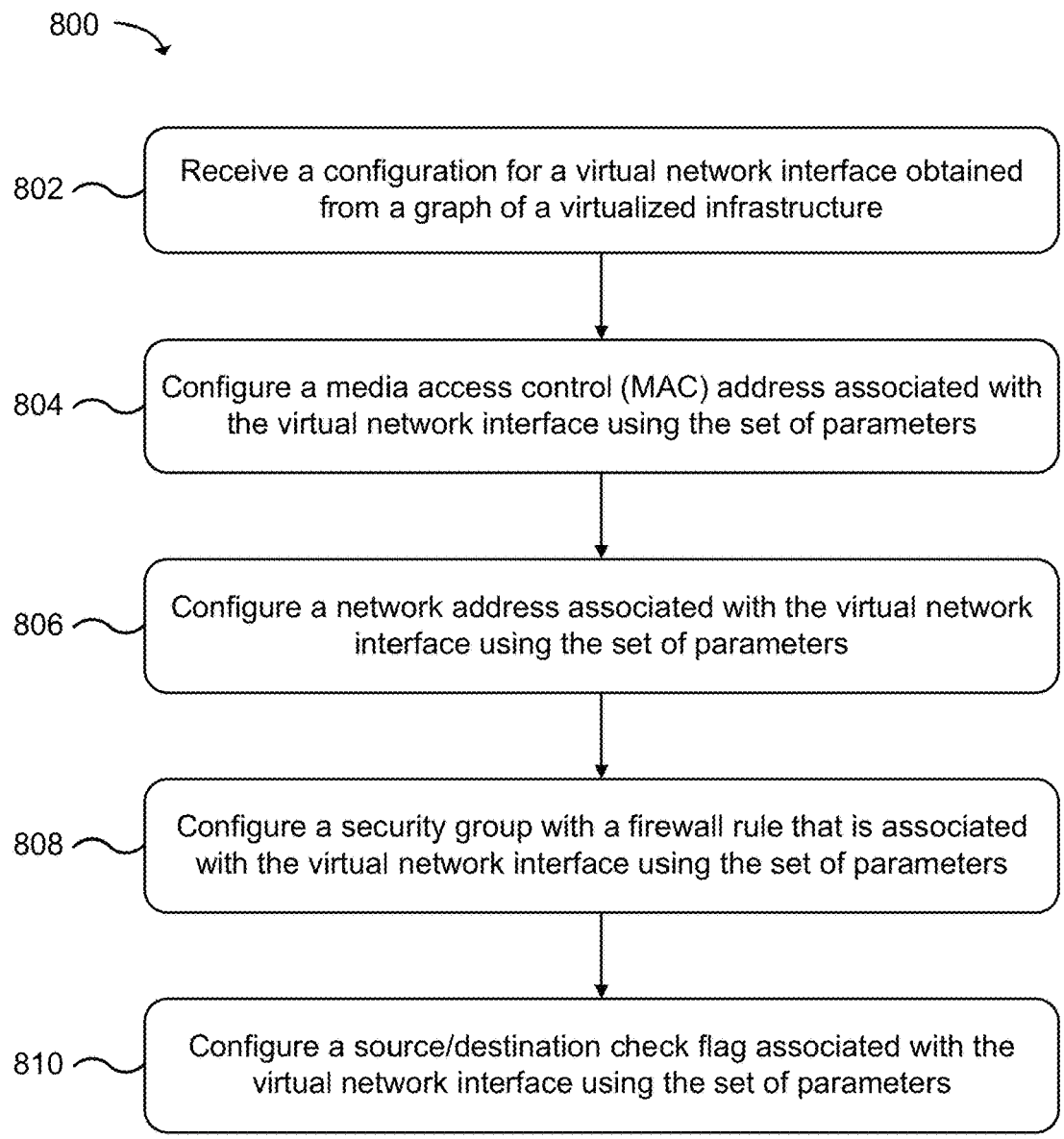
FIG. 8 is a flow diagram that illustrates an example method for setting parameters of various attributes associated with a virtual network interface using a configuration determined from a graph of a virtualized infrastructure that includes representations of virtualized infrastructure resources and application dataflows according to one example of the present technology.

FIG. 8 is a flow diagram that illustrates an example method 800 for setting parameters of various attributes associated with a virtual network interface using a configuration determined from a graph of a virtualized infrastructure that includes representations of virtualized infrastructure resources and application dataflows according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

FIG. 8 is a flow diagram that illustrates an example method 800 for setting parameters of various attributes associated with a virtual network interface using a configuration derived from an infrastructure map in the form of a graph according to one example of the present technology. The method 800 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 802, a server computer may receive a configuration for a virtual network interface obtained from a graph of a virtualized infrastructure. The server computer may be part of an infrastructure management service or an infrastructure deployment service in the service provider environment. The server computer may receive the set of parameters in a template file to create and delete a collection of resources together as a single unit (e.g., a stack). For example, the template file may describe a computing instance, such as the instance type, a machine image identifier, block device mappings, and the like. The template file may further describe a virtual network interface, such as the interface type, an interface identifier, layer 2 and 3 configurations, network restrictions, security groups, network access control lists (NACLs), and the like.

In operation 804, the server computer may configure a media access control (MAC) address associated with the virtual network interface using the set of parameters. For example, the server computer may configure the virtual network interface with a MAC address for use with a virtualized Ethernet network. In operation 806, the server computer may configure a network address associated with the virtual network interface using the set of parameters. For example, the server computer may configure the virtual network interface with an Internet Protocol (IP) address for use with the virtualized Ethernet network and an IP subnet.

In operation 808, the server computer may configure a security group with a firewall rule that is associated with the virtual network interface using the set of parameters. The security group may be associated with a virtualized infrastructure resource and provide security at the protocol and port access level. The security group may operate as a firewall and contain a set of firewall rules that filter traffic coming into and out of a virtualized infrastructure resource. Some examples of filtering traffic coming into and out of a virtualized infrastructure resource may include allowing traffic, denying traffic, dropping traffic, forwarding traffic, translating traffic, mangling traffic, and the like.

In operation 810, the server computer may configure a source or destination check flag associated with the virtual network interface using the set of parameters. A source or destination check flag may include an attribute that controls whether source/destination checking is enabled on a virtualized infrastructure resource. Enabling the attribute configures the virtualized infrastructure resource to handle network traffic, for example, to deny, drop, or otherwise ignore network traffic that is not specifically destined for the resource. Disabling the attribute removes any checks by the virtualized infrastructure resource on input, forward, or output network traffic.

Therefore, the server computer may configure various attributes associated with the virtual network interface using the configuration derived from the graph. The server computer graph can improve management and deployment by deriving configurations from the graph to configure multiple different resources. The server computer may create the resources using the graph and then configure the resources to work together according to the application dataflows in the graph. Implementing these tasks individually can add complexity and time.

Figure 9:
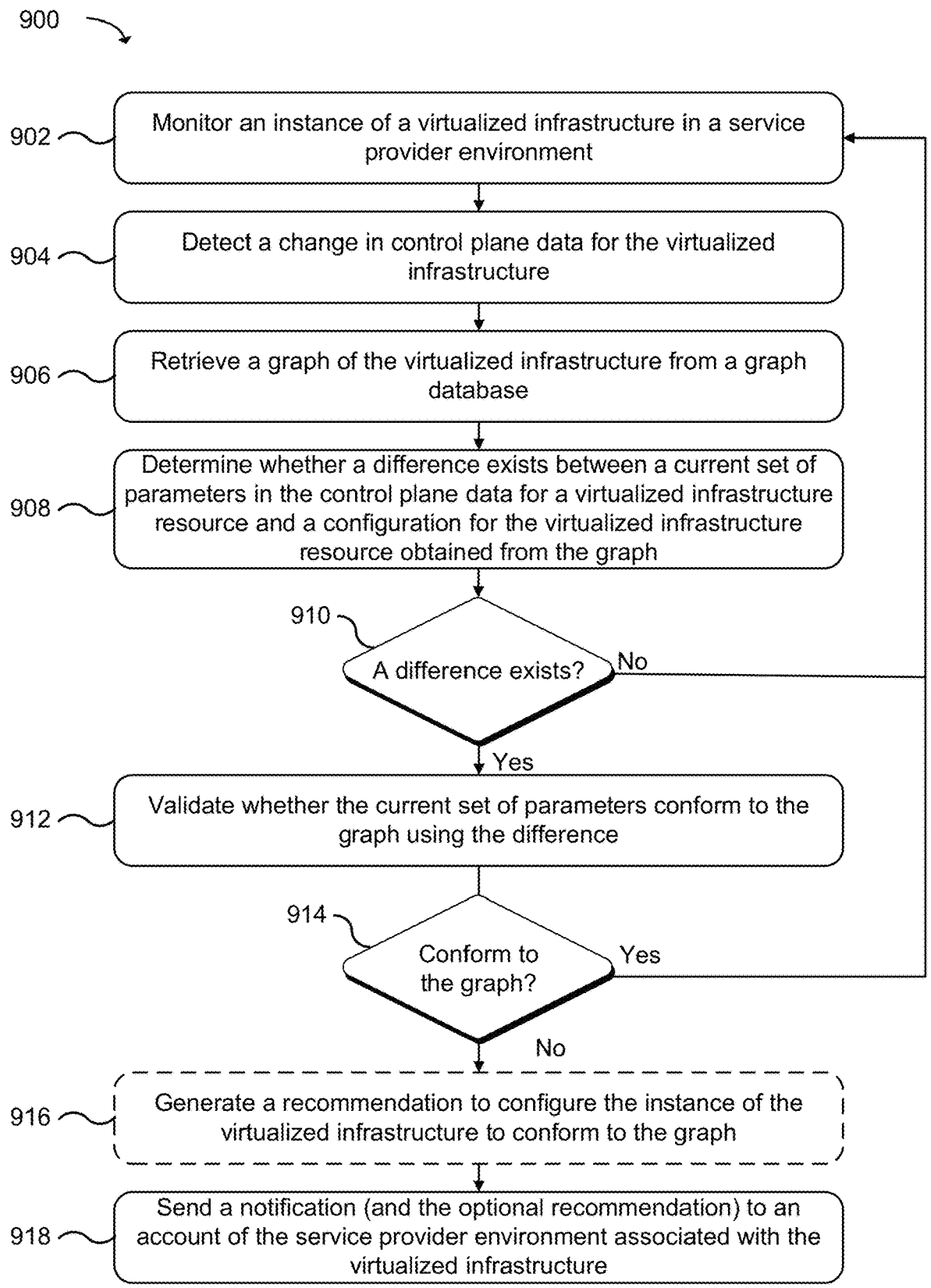
FIG. 9 is a flow diagram that illustrates an example method for validating a configuration of an instance of a virtualized infrastructure in a service provider environment using an infrastructure map in the form of a graph according to one example of the present technology.

FIG. 9 is a flow diagram that illustrates an example method 900 for validating a configuration of an instance of a virtualized infrastructure in a service provider environment using an infrastructure map in the form of a graph according to one example of the present technology. The method 900 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 902, an infrastructure monitoring service in a service provider environment may monitor an instance of a virtualized infrastructure in the service provider environment. The infrastructure monitoring service may include one or more server computers configured to monitor values, settings, parameters, and the like, in control plane data of the service provider environment that form a configuration of a virtualized infrastructure resource. The infrastructure monitoring service may also include one or more server computers configured to monitor events resulting from changes to the values, settings, parameters, and the like, in the control plane data. The infrastructure monitoring service may obtain the control plane data from a control plane of the service provider environment.

In operation 904, the infrastructure monitoring service may detect a change in the control plane data for the virtualized infrastructure. The infrastructure monitoring service may detect the change in response to a configuration action by a user of an account in the service provider environment.

In operation 906, the infrastructure monitoring service may retrieve the graph of the virtualized infrastructure from a graph database. The infrastructure monitoring service may use the graph of the virtualized infrastructure as a source of truth for the configuration of virtualized infrastructure resources and application dataflows in the virtualized infrastructure. In one example, the infrastructure monitoring service may retrieve the graph from the graph database in response to a request to audit the virtualized infrastructure resources or application dataflows in the virtualized infrastructure. In another example, the infrastructure monitoring service may retrieve the graph from the graph database in response to detecting the change in operation 904. In a further example, the infrastructure monitoring service may retrieve the graph from the graph database in response to an instruction to periodically audit the virtualized infrastructure.

In operation 908, the infrastructure monitoring service may determine whether a difference exists between a current set of parameters in the control plane data for a virtualized infrastructure resource and a configuration for the virtualized infrastructure resource obtained from the graph. The infrastructure monitoring service may identify virtualized infrastructure resources or application dataflows in the nodes and edges associated with the graph. The infrastructure monitoring service may compute a configuration expected for the virtualized infrastructure resources and application dataflows in the virtualized infrastructure from the graph. The infrastructure monitoring service may determine whether or not the current set of parameters in the control plane data is different from the set of parameters in the configuration obtained from the graph.

For example, the infrastructure monitoring service may compare values, settings, parameters, and the like, in the current set of parameters in the configuration of a virtualized infrastructure resource to the parameters obtained from the graph that correspond to the virtualized infrastructure resource. In another example, the infrastructure monitoring service may determine whether the values, settings, parameters, and the like, in the current set of parameters in the configuration of the virtualized infrastructure resource are overly permissive or overly restrictive when compared to the derived set of parameters obtained from the graph.

If the infrastructure monitoring service determines that a difference does not exist in operation 908, the method 900 continues from operation 910 to operation 902 where the infrastructure monitoring service resumes monitoring the instance of the virtualized infrastructure. If the infrastructure monitoring service determines that a difference exists in operation 908, the method 900 continues from operation 910 to operation 912 where the infrastructure monitoring service may validate whether the current set of parameters conform to the graph using the difference. For example, the infrastructure monitoring service may determine whether the difference between the current set of parameters associated with a virtual network interface and the set of parameters obtained from the graph for the corresponding virtual network interface causes the current configuration to be invalid. In one example, an overly permissive configuration may be significant to the security of the virtualized infrastructure causing the current configuration to be invalid. In contrast, a more restrictive configuration may improve the security of the virtualized infrastructure beyond that defined by the graph and the infrastructure monitoring service may allow the current configuration to remain in effect.

If the infrastructure monitoring service determines that the current set of parameters conform to the graph in operation 914, the method 900 continues from operation 914 to operation 902 where the infrastructure monitoring service resumes monitoring the instance of the virtualized infrastructure. If the infrastructure monitoring service determines that the current set of parameters does not conform to the graph in operation 914, the method 900 continues from operation 914 to optional operation 916 and operation 918. In optional operation 916, the infrastructure monitoring service may generate a recommendation to configure the virtualized infrastructure to confirm to the graph. The recommendation may include one or more actions that may be taken with respect to the control plane data to configure virtualized infrastructure resources or application dataflows as in the graph. For example, the infrastructure monitoring service may generate a recommendation to allow or block network traffic, set or remove security permissions on storage resources, install anti-virus software on a computing instance, or remove an application. In a further example, the infrastructure monitoring service may generate a recommendation to configure a virtual network interface to secure against uncontrolled network traffic. The infrastructure monitoring service may include a textual or graphical element in the notification that enables a device receiving of the notification to implement the proposed recommendation (i.e., click a button to implement the change).

In operation 918, the infrastructure monitoring service may send a notification (and the optional recommendation) to an account in the service provider environment associated with the virtualized infrastructure. The notification may include an alert that a difference exists between an instance of the virtualized infrastructure and the graph. The notification may identify any virtualized infrastructure resources in the virtualized infrastructure that are configured differently from the graph. The infrastructure monitoring service may send the notification via email, text message, instant message, a popup alert, and the like. The infrastructure monitoring service may send the notification to multiple users associated with the account.

Therefore, the infrastructure monitoring service may allow the account to be notified of differences between the virtualized infrastructure when deployed as an instance in the service provider environment and the virtualized infrastructure represented in the graph. The infrastructure monitoring service may use the graph to automatically alert the account of a potentially misconfigured virtualized infrastructure resource. The graph can also provide an auditor or engineer with a design from which the appropriate configuration of a virtualized infrastructure resource may be checked.

Figure 10:
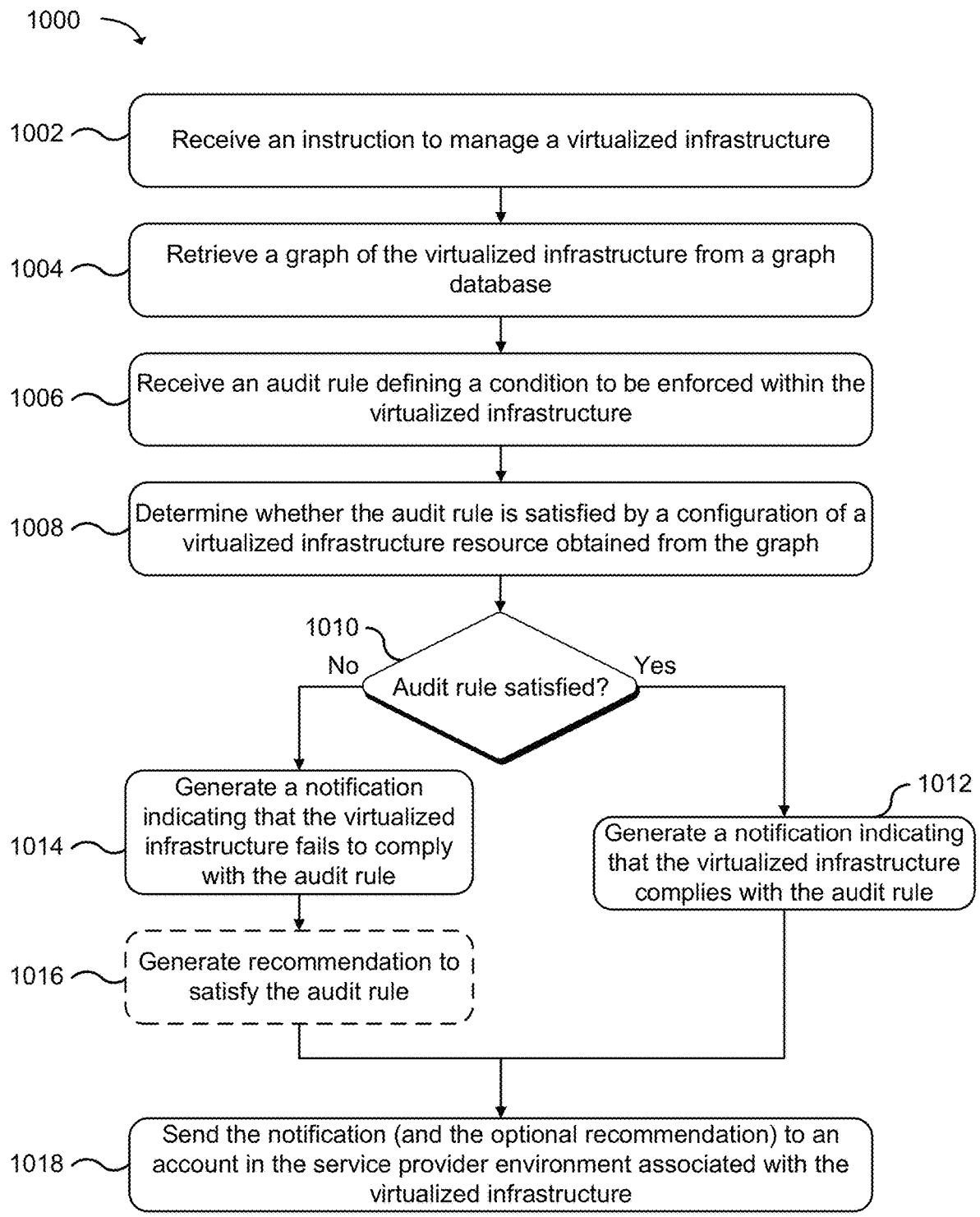
FIG. 10 is a flow diagram that illustrates an example method for auditing conditions or configurations to be enforced within a virtualized infrastructure using an infrastructure map in the form of a graph according to one example of the present technology.
Figure 11:
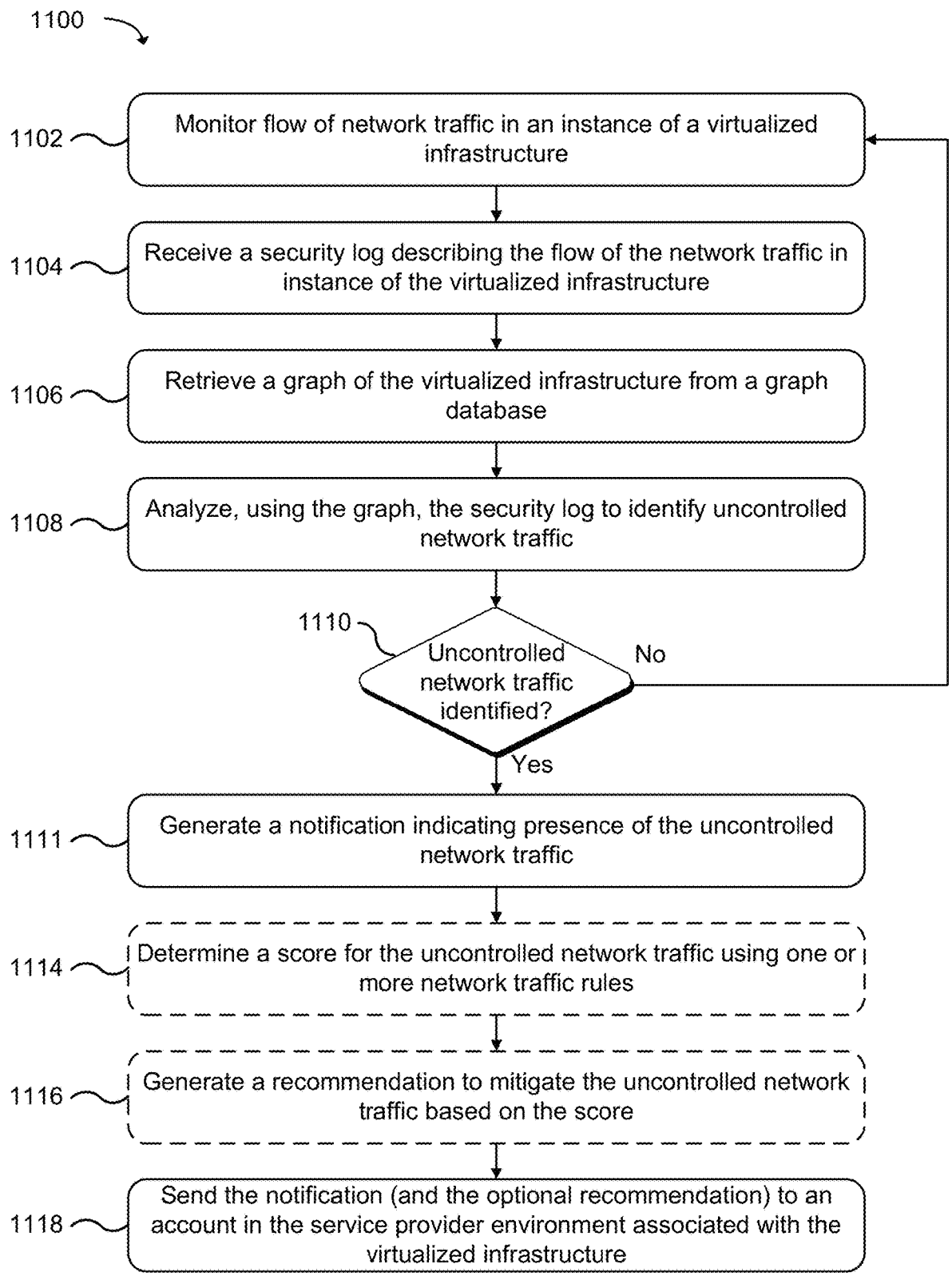
FIG. 11 is a flow diagram that illustrates an example method for auditing security of a virtualized infrastructure using an infrastructure map in the form of a graph according to one example of the present technology.

FIG. 10 is a flow diagram that illustrates an example method for auditing conditions or configurations to be enforced within a virtualized infrastructure using an infrastructure map in the form of a graph according to one example of the present technology. The method 1000 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1002, an infrastructure monitoring service in a service provider environment may receive an instruction to manage a virtualized infrastructure. According to the present technology, the infrastructure monitoring service may monitor the virtualized infrastructure by monitoring a graph of the virtualized infrastructure. In operation 1004, the infrastructure monitoring service may retrieve a graph of the virtualized infrastructure from a graph database.

In operation 1006, the receive infrastructure monitoring service may receive an audit rule defining a condition to be enforced within the virtualized infrastructure. In operation 1008, the infrastructure monitoring service may determine whether the audit rule is satisfied by a configuration of a virtualized infrastructure resource obtained from the graph. The infrastructure monitoring service may compute a configuration for the virtualized infrastructure resource using the graph. The infrastructure monitoring service may determine whether the condition, in the audit rule, to be enforced within the virtualized infrastructure is satisfied by the configuration for the virtualized infrastructure resource obtained from the graph.

If the infrastructure monitoring service determines that the audit rule is satisfied in operation 1008, the method 1000 continues from operation 1010 to operation 1012 where the infrastructure monitoring service generates a notification indicating that the virtualized infrastructure complies with the audit rule. If the infrastructure monitoring service determines that the audit rule is not satisfied in operation 1008, the method 1000 continues from operation 1010 to operation 1014 where the infrastructure monitoring service generates a notification indicating that the virtualized infrastructure fails to comply with the audit rule. In optional operation 1016, the infrastructure monitoring service may generate a recommendation to satisfy the audit rule. The recommendation may include one or more actions that may be taken to configure the virtualized infrastructure resource. In operation 1018, the infrastructure monitoring service may send the notification generated in operation 1012 or operation 1014 (and the optional recommendation) to an account in the service provider environment associated with the virtualized infrastructure.

Figure 12:
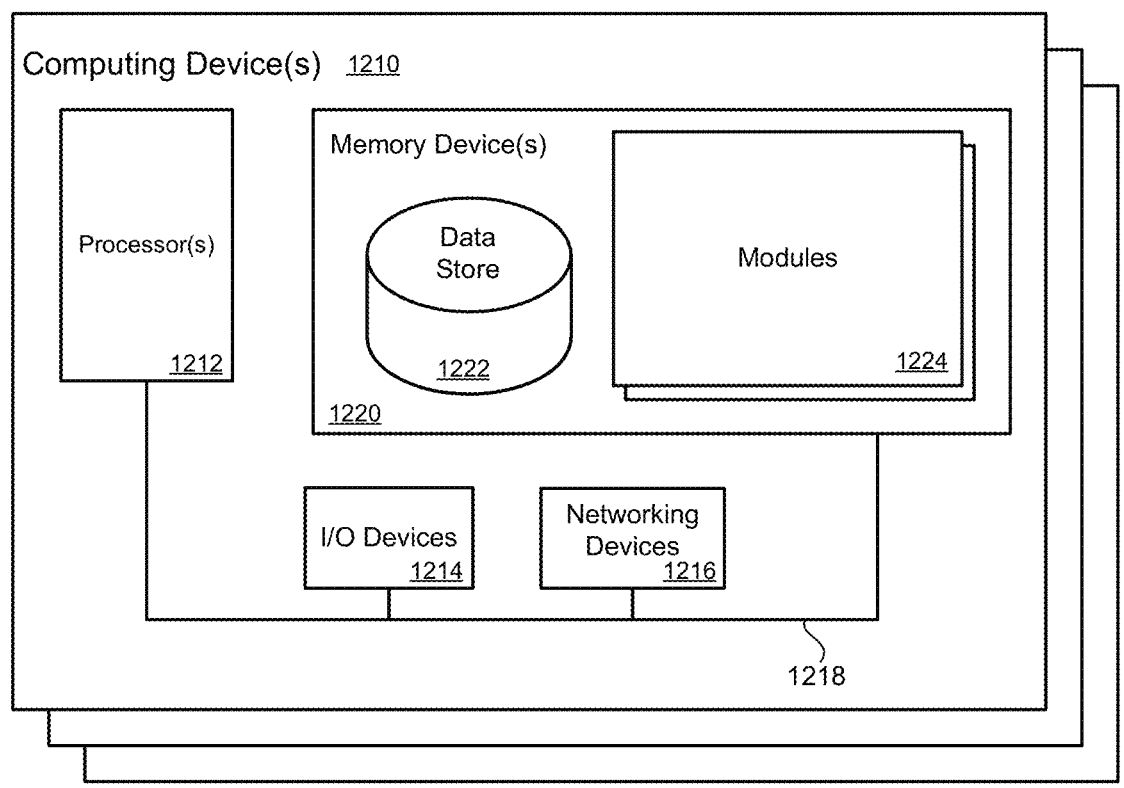
FIG. 12 is a block diagram that provides an example illustration of a computing device that may be employed according to an example of the present technology.

FIG. 12 is a flow diagram that illustrates an example method 1100 for auditing security of a virtualized infrastructure using an infrastructure map in the form of a graph according to one example of the present technology. The method 1100 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements.

In operation 1102, an infrastructure monitoring service in a service provider environment may monitor flow of network traffic in a virtualized infrastructure. In operation 1104, the infrastructure monitoring service may receive a security log describing the flow of network traffic in the virtualized infrastructure. In operation 1106, the infrastructure monitoring service may retrieve a graph of the virtualized infrastructure from a graph database.

In operation 1108, the infrastructure monitoring service may analyze, using the graph, the security log to identify uncontrolled network traffic. For example, the infrastructure monitoring service may compute a configuration for a virtual network interface from the graph. The infrastructure monitoring service may analyze bytes, words, packets, datagrams, frames, and the like, and portions thereof, such as values, fields, headers, and segments, and the like, in the security log to determine whether the flow of network traffic proceeds according to the configuration for the virtual network interface obtained from the graph. The infrastructure monitoring service may filter out network traffic in the flow that proceeds according to the configuration for the virtual network interface obtained from the graph to identify uncontrolled network traffic.

If the infrastructure monitoring service does not identify uncontrolled network traffic in operation 1108, the method 1100 continues from operation 1110 to operation 1102 where the infrastructure monitoring service resumes monitoring the flow of network traffic in the virtualized infrastructure. If the infrastructure monitoring service does identify uncontrolled network traffic in operation 1108, the method 1100 continues from operation 1110 to operation 1111 where the infrastructure monitoring service generates a notification associated with the uncontrolled network traffic. The notification may include an alert to the presence of the uncontrolled network traffic in the virtualized infrastructure. The notification may include a summary or sample of the uncontrolled network traffic and identify any virtualized infrastructure resources participating in the uncontrolled network traffic.

In optional operation 1114, the infrastructure monitoring service may determine a score for the uncontrolled network traffic. The infrastructure monitoring service may apply a scoring rule to the uncontrolled network traffic to determine a score. The scoring rule may include a condition that allocates a numerical or categorical score to the uncontrolled network traffic. The condition may relate to the attributes or contents of the uncontrolled network traffic. For example, the condition may check for header information, such as a source address, a destination address, a protocol type, and the like. In another example, the condition may check for particular content, data signatures, viruses, command and control instructions, sequences of data generated by a given application, and the like. The infrastructure monitoring service may apply multiple scoring rules to determine a cumulative score for the uncontrolled network traffic.

In optional operation 1116, the infrastructure monitoring service may generate a recommendation to mitigate the uncontrolled network traffic based on the score. The recommendation may include one or more actions that may be taken with respect to the uncontrolled network traffic. For example, the infrastructure monitoring service may generate a recommendation to block the uncontrolled network traffic when the score exceeds a threshold. In another example, the infrastructure monitoring service may generate a recommendation to run a virus scan on a computing instance or remove an unauthorized application. In a further example, the infrastructure monitoring service may generate a recommendation to configure a virtual network interface to secure against the uncontrolled network traffic. The infrastructure monitoring service may include a textual or graphical element in the notification that enables a device receiving of the notification to implement the proposed recommendation.

In operation 1118, the infrastructure monitoring service may send the notification (and the optional recommendation) to an account in the service provider environment associated with the virtualized infrastructure.

FIG. 12 illustrates one or more computing device(s) 1210 on which modules or code components of this technology may execute. A first computing device 1210 is illustrated on which a high-level example of the technology may be executed. The first computing device 1210 may include one or more processor(s) 1212 that are in communication with memory device(s) 1220. The computing device may include a local communication interface 1218 for the components in the computing device. For example, the local communication interface may be a local data bus and/or any related address or control busses as may be desired.

The memory device(s) 1220 may contain modules 1224 or code components that are executable by the processor(s) 1212 and data for the modules 1224. The modules 1224 may execute the functions described earlier. A data store 1222 may also be located in the memory device(s) 1220 for storing data related to the modules 1224 and other applications along with an operating system that is executable by the processor(s) 1212.

Other applications may also be stored in the memory device(s) 1220 and may be executable by the processor(s) 1212. Components or modules discussed in this description that may be implemented in the form of software using high programming level languages that are compiled, interpreted, or executed using a hybrid of the methods.

The computing device may also have access to I/O (input/output) devices 1214 that are usable by the computing devices. An example of an I/O device is a display screen that is available to display output from the computing devices. Other known I/O device may be used with the computing device as desired. The networking devices 1216 and similar communication devices may be included in the computing device. The networking devices 1216 may be wired or wireless networking devices that connect to the internet, a LAN, WAN, or other computing network.

The components or modules that are shown as being stored in the memory device(s) 1220 may be executed by the processor(s) 1212. The term "executable" may mean a program file that is in a form that may be executed by a processor(s) 1212. For example, a program in a higher-level language may be compiled into machine code in a format that may be loaded into a random-access portion of the memory device(s) 1220 and executed by the processor(s) 1212, or source code may be loaded by another executable program and interpreted to generate instructions in a random-access portion of the memory to be executed by a processor. The executable program may be stored in any portion or component of the memory device(s) 1220. For example, the memory device(s) 1220 may be random access memory (RAM), read only memory (ROM), flash memory, a solid-state drive, memory card, a hard drive, optical disk, floppy disk, magnetic tape, or any other memory components.

The processor(s) 1212 may represent multiple processors and the memory 1220 may represent multiple memory units that operate in parallel to the processing circuits. This may provide parallel processing channels for the processes and data in the system. The local communication interface 1218 may be used as a network to facilitate communication between any of the multiple processors and multiple memories. The local communication interface 1218 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules, and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method, comprising:
   receiving, at an infrastructure service of a service provider environment, control plane data from a control plane associated with a virtualized infrastructure in the service provider environment that identifies a first virtualized infrastructure resource having a first virtual network interface and a second virtualized infrastructure resource having a second virtual network interface;
   receiving segmentation data that defines a segmentation in a flow of network traffic between the first virtual network interface and the second virtual network interface;
   generating a graph of the virtualized infrastructure that includes a representation of the first virtualized infrastructure resource and the second virtualized infrastructure resource, wherein the graph is determined using the control plane data and an application dataflow representing the segmentation in the flow of the network traffic between the first virtual network interface and the second virtual network interface, wherein the application dataflow is determined using the segmentation data;
   setting, in response to an instruction to deploy an instance of the virtualized infrastructure in the service provider environment, a parameter of the first virtualized infrastructure resource and the second virtualized infrastructure resource in the instance of the virtualized infrastructure, wherein the parameter is set using a configuration of the first virtualized infrastructure resource and the second virtualized infrastructure resource determined from the representation of the first virtualized infrastructure resource and the second virtualized infrastructure resource in the graph; and
   setting a parameter of the first virtual network interface and the second virtual network interface in the instance of the virtualized infrastructure, using a configuration of the first virtual network interface and the second virtual network interface determined from the application dataflow in the graph, to secure the flow of the network traffic in the instance of the virtualized infrastructure.

2. The method of claim 1, further comprising receiving, at the infrastructure service, the control plane data in response to querying the control plane of the service provider environment for a set of virtual network interfaces associated with an account of the service provider environment.

3. The method of claim 1, wherein setting the parameter of the first virtual network interface and the second network interface using the configuration of the first virtual network interface and the second network interface determined from the application dataflow in the graph comprises establishing a firewall rule that is associated with the first virtual network interface and the second virtual network interface.

4. The method of claim 1, further comprising:
   identifying, by the infrastructure service, a current set of parameters associated with the first virtual network interface and the second network interface in additional control plane data obtained from the control plane of the service provider environment;
   comparing the current set of parameters to the configuration of the first virtual network interface and the second virtual network interface determined from the graph to determine a difference between the current set of parameters and the configuration of the first virtual network interface and the second virtual network interface determined from the graph;
   determining whether the current set of parameters in the additional control plane data associated with the first virtual network interface conforms to the graph using the difference between the current set of parameters and the configuration of the first virtual network interface and the second virtual network interface determined from the graph; and
   sending, by the infrastructure service, a notification to an account associated with the virtualized infrastructure when the current set of parameters does not conform to the graph.

5. The method of claim 1, further comprising:
   receiving, by the infrastructure service, an audit rule defining a condition to be enforced within the virtualized infrastructure;
   determining whether the configuration of the first virtual network interface and the second virtual network interface determined from the graph satisfy the condition; and sending, by the infrastructure service, a notification indicating that the instance of the virtualized infrastructure in the service provider environment fails to comply with the audit rule when the configuration of the first virtual network interface and the second virtual network interface determined from the graph fails to satisfy the condition.

6. A method, comprising:

receiving, at an infrastructure service of a service provider environment, a graph including an application dataflow representing a flow of network traffic between virtualized infrastructure resources in a virtualized infrastructure;

identifying by one or more computing resources of the service provider environment, from the graph, a representation of a virtualized infrastructure resource in the virtualized infrastructure that is associated with the application dataflow;

determining by the one or more computing resources, from the graph, a configuration of the virtualized infrastructure resource using the representation of the virtualized infrastructure resource and the application dataflow; and setting, by the one or more computing resources of the infrastructure service, a parameter of the virtualized infrastructure resource using the configuration of the virtualized infrastructure resource determined, by the one or more computing resources, from the graph to manage the flow of the network traffic in the virtualized infrastructure.

7. The method of claim 6, further comprising:

identifying a node of the graph that represents the virtualized infrastructure resource; and identifying an edge of the graph that is connected to the node and represents the application dataflow.

8. The method of claim 6, wherein setting the parameter of the virtualized infrastructure resource using the configuration determined from the graph comprises configuring a network address or port associated with a virtual network interface of a virtualized executable resource.

9. The method of claim 6, wherein setting the parameter of the virtualized infrastructure resource using the configuration determined from the graph comprises configuring a source or destination check flag associated with a virtual network interface.

10. The method of claim 6, wherein setting the parameter of the virtualized infrastructure resource using the configuration determined from the graph comprises establishing a security group with a firewall rule that is associated with the virtualized infrastructure resource.

11. The method of claim 6, further comprising:

identifying, by the infrastructure service, a first set of parameters associated with an instance of the virtualized infrastructure resource in the service provider environment;

comparing the first set of parameters to a second set of parameters in the configuration of the virtualized infrastructure resource obtained from the graph to determine a difference between the first set of parameters and the second set of parameters from the graph; and determining whether the first set of parameters conform to the graph using the difference between the first set of parameters and the second set of parameters from the graph.

12. The method of claim 11, further comprising:

detecting, by the infrastructure service, a change to the first set of parameters; and determining whether the change to the first set of parameters conforms to the graph using the difference between the first set of parameters and the second set of parameters from the graph.

13. The method of claim 11, further comprising:

determining, by the infrastructure service, that the first set of parameters fails to conform to the graph using the difference between the first set of parameters and the second set of parameters from the graph; and generating, by the infrastructure service, a recommendation to change the first set of parameters using the second set of parameters from the graph.

14. The method of claim 6, further comprising:

receiving, by the infrastructure service, an audit rule defining a condition to be enforced within the virtualized infrastructure;

determining whether the configuration of the virtualized infrastructure resource determined from the graph satisfies the condition; and generating, by the infrastructure service, a notification indicating that the virtualized infrastructure fails to comply with the audit rule when the configuration of the virtualized infrastructure resource determined from the graph fails to satisfy the condition.

15. The method of claim 6, further comprising:

receiving, by the infrastructure service, a security log describing the flow of network traffic associated with an instance of the virtualized infrastructure resource in the service provider environment;

analyzing the security log using the graph to identify uncontrolled network traffic associated with the instance of the virtualized infrastructure resource; and generating, by the infrastructure service, a notification indicating presence of the uncontrolled network traffic in the virtualized infrastructure.

16. The method of claim 6, further comprising:

retrieving, by the infrastructure service, the graph from a graph database in response to a request to deploy an instance of the virtualized infrastructure in the service provider environment; and sending, by the infrastructure service, the parameter of the virtualized infrastructure resource set using the configuration determined from the graph to a control plane of the service provider environment to deploy the instance of the virtualized infrastructure onto physical hosts and physical networking devices in the service provider environment.

17. A system, comprising:

a graph database storing a graph, the graph including an application dataflow representing segmentation in a flow of network traffic between a first virtualized infrastructure resource and second virtualized infrastructure resource in a virtualized infrastructure of a service provider environment;

one or more processors; and a memory storing instructions which, when executed by the one or more processors, cause the one or more processors to:

retrieve the graph from the graph database in response to a request to manage an instance of the virtualized infrastructure in the service provider environment;

identify, from the graph, a virtual network interface for the first virtualized infrastructure resource in the virtualized infrastructure that is associated with the application dataflow;

determine, from the graph, a configuration of a virtual network interface in the instance of the virtualized infrastructure using a representation of the first virtualized infrastructure resource and the application dataflow in the graph; and set a parameter of the virtual network interface using the configuration determined from the graph to secure the flow of the network traffic in the instance of the virtualized infrastructure.

18. The system of claim 17, wherein the instructions further cause the one or more processors to set the parameter of the virtual network interface using the configuration determined from the graph to configure at least one of: a network address or port, a source or destination check flag, or a security group with a firewall rule that is associated with the virtual network interface.

19. The system of claim 17, wherein the instructions further cause the one or more processors to:

detect a change to the parameter of the virtual network interface;

compare the change to the configuration determined from the graph to determine a difference;

determine whether the change conforms to the graph using the difference; and generate a notification indicating whether the change conforms to the graph.

20. The system of claim 17, wherein the instructions further cause the one or more processors to:

receive an audit rule defining a condition to be enforced within the virtualized infrastructure;

determine whether the configuration determined from the graph for the virtual network interface satisfies the condition; and generate a notification indicating that the instance of the virtualized infrastructure fails to comply with the audit rule when the configuration determined from the graph for the virtual network interface fails to satisfy the condition.

* * * * *